(12) United States Patent
Yamada

(10) Patent No.: US 9,418,436 B2
(45) Date of Patent: Aug. 16, 2016

(54) IMAGE PROCESSING APPARATUS, IMAGING APPARATUS, AND IMAGE PROCESSING METHOD

(71) Applicant: Panasonic Corporation, Osaka (JP)

(72) Inventor: Hitoshi Yamada, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 250 days.

(21) Appl. No.: 14/110,210

(22) PCT Filed: Jan. 21, 2013

(86) PCT No.: PCT/JP2013/000248
§ 371 (c)(1),
(2) Date: Oct. 7, 2013

(87) PCT Pub. No.: WO2013/111552
PCT Pub. Date: Aug. 1, 2013

(65) Prior Publication Data

US 2014/0049614 A1 Feb. 20, 2014

(30) Foreign Application Priority Data

Jan. 27, 2012 (JP) .................. 2012-015174

(51) Int. Cl.
*H04N 13/00* (2006.01)
*H04N 15/00* (2006.01)
(Continued)

(52) U.S. Cl.
CPC ............ *G06T 7/0075* (2013.01); *G06T 7/0065* (2013.01); *G06T 7/0097* (2013.01); *G06T 11/60* (2013.01); *H04N 5/2226* (2013.01); *H04N 5/23293* (2013.01); *H04N 13/004* (2013.01);
(Continued)

(58) Field of Classification Search
USPC ................... 348/42, 51, 52, 53; 386/326, 335
See application file for complete search history.

(56) References Cited

U.S. PATENT DOCUMENTS 6,069,713 A 5/2000 Kusama
6,473,516 B1 * 10/2002 Kawaguchi et al. .......... 382/100
(Continued)

FOREIGN PATENT DOCUMENTS

CN 101523434 9/2009
CN 101902582 12/2010
(Continued)

OTHER PUBLICATIONS

International Search Report issued Apr. 2, 2013 in International (PCT) Application No. PCT/JP2013/000248.
(Continued)

*Primary Examiner* — Daquan Zhao
(74) *Attorney, Agent, or Firm* — Wenderoth, Lind & Ponack, L.L.P.

(57) ABSTRACT

An image processing apparatus includes: an image obtainment unit that obtains an image; an information obtainment unit that obtains embedment information that is to be embedded into a region within the image obtained by the image obtainment unit; a depth information obtainment unit that obtains depth information indicating a depth value of each pixel in the image obtained by the image obtainment unit; and an embedment region determination unit that determines, using the depth information, an embedment region into which the embedment information is to be embedded.

19 Claims, 23 Drawing Sheets

(51) Int. Cl.
*H04N 13/02* (2006.01)
*H04N 13/04* (2006.01)
*H04N 5/84* (2006.01)
*G06T 7/00* (2006.01)
*H04N 5/222* (2006.01)
*H04N 5/232* (2006.01)
*G06T 11/60* (2006.01)
*H04N 9/47* (2006.01)
*H04N 5/92* (2006.01)
*H04N 5/89* (2006.01)

(52) U.S. Cl.
CPC ...... *H04N 13/02* (2013.01); *G06T 2207/10012* (2013.01); *G06T 2207/10028* (2013.01); *G06T 2207/10148* (2013.01); *H04N 13/007* (2013.01); *H04N 13/0239* (2013.01); *H04N 13/0271* (2013.01); *H04N 13/0296* (2013.01)

(56) References Cited

U.S. PATENT DOCUMENTS

| | | | |
|---|---|---|---|
| 8,331,711 | B2 | 12/2012 | Gangwal et al. |
| 8,599,242 | B2 * | 12/2013 | Suh et al. ............ 348/43 |
| 2010/0002948 | A1 | 1/2010 | Gangwal et al. |
| 2010/0238267 | A1 * | 9/2010 | Izzat et al. ............ 348/43 |
| 2010/0272417 | A1 * | 10/2010 | Nagasawa et al. ............ 386/97 |
| 2011/0018966 | A1 | 1/2011 | Kitazato |
| 2011/0134114 | A1 * | 6/2011 | Rais et al. ............ 345/419 |
| 2011/0292174 | A1 * | 12/2011 | Suh et al. ............ 348/43 |
| 2012/0002010 | A1 | 1/2012 | Shimaya et al. |
| 2012/0163701 | A1 * | 6/2012 | Gomi ............ 382/154 |

FOREIGN PATENT DOCUMENTS

| | | |
|---|---|---|
| JP | 10-228547 | 8/1998 |
| JP | 11-289555 | 10/1999 |
| JP | 2004-104331 | 4/2004 |
| JP | 2009-200784 | 9/2009 |
| JP | 2011-029849 | 2/2011 |
| JP | 2012-015771 | 1/2012 |

OTHER PUBLICATIONS

Office Action issued Sep. 21, 2015 in corresponding Chinese Application No. 201380000983.2, with English translation of Search Report.

Office Action issued May 13, 2016 in corresponding Chinese Patent Application No. 201380000983.2, with English translation of Search Report.

* cited by examiner

Search region

Embedment region

Embedment region

Search region

Search region

Embedment region

Embedment region

Frame

Low ←———— Reliability ————→ High

IMAGE PROCESSING APPARATUS, IMAGING APPARATUS, AND IMAGE PROCESSING METHOD

TECHNICAL FIELD

The present invention relates to an image processing apparatus for use in image processing for embedding information into a region within an image.

BACKGROUND ART

Patent Literatures (PTLs) 1 and 2 disclose techniques relating to the image processing for embedding information into a region within an image.

CITATION LIST

Patent Literature

[PTL 1] Japanese Unexamined Patent Application Publication No. 2009-200784
[PTL 2] Japanese Unexamined Patent Application Publication No. 2004-104331

SUMMARY OF INVENTION

Technical Problem

However, there is a possibility that embedding information into an inappropriate region lowers the viewability of the image or the information.

Thus, the present invention provides an image processing apparatus which is capable of properly determining a region into which information is to be embedded.

Solution to Problem

An image processing apparatus according to an aspect of the present invention comprises: an image obtainment unit configured to obtain an image; an embedment information obtainment unit configured to obtain embedment information that is to be embedded into a region within the image; a depth information obtainment unit configured to obtain depth information indicating a depth value of each of pixels in the image; and an embedment region determination unit configured to determine, using the depth information, an embedment region that is the region into which the embedment information is to be embedded.

It is to be noted that these generic or specific aspects may be implemented using a system, a method, an integrated circuit, a computer program, or a non-transitory computer-readable recording medium such as a compact disc read only memory (CD-ROM), and may also be implemented by any combination of systems, apparatuses, methods, integrated circuits, computer programs, and recording media.

Advantageous Effects of Invention

An image processing apparatus according to an aspect of the present invention is capable of properly determining a region into which information is to be embedded.

DESCRIPTION OF EMBODIMENTS (Underlying Knowledge Forming Basis of the Present Invention)

The inventor of the present invention has found the following problems in the technique, stated in the [Background Art] section, which relates to the image processing for embedding information into a region within an image.

Figure 1:
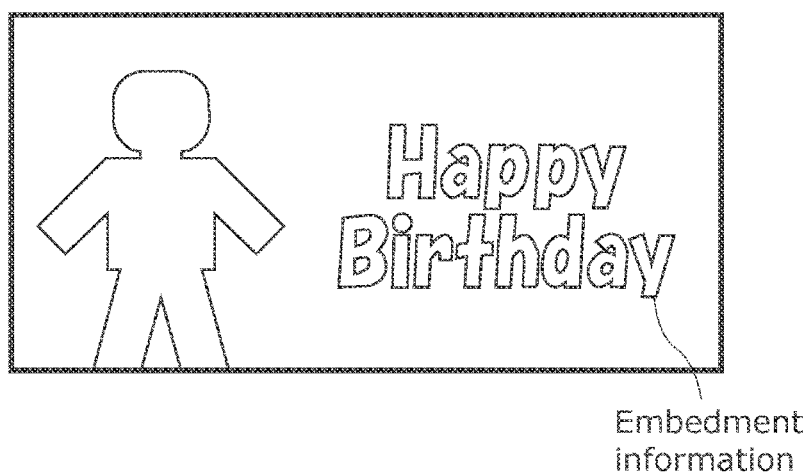
FIG. 1 shows an image with embedment information already embedded therein.

An image processing apparatus exists which has an embedding function for embedding a text message, a decoration part, or the like in an image captured by shooting, etc, A possible application of such an embedding function is, for example, to add a message to a captured image by a participant in an event such as a birthday party or a wedding party (see FIG. 1).

Here, information, such as a message, which is to be embedded in an image is referred to as embedment information. Embedding the embedment information in an image means positioning the embedment information on the image and superimposing the embedment information on the image. Therefore, embedding the embedment information in the image will cause a part of the image to be hidden.

Thus, there is a possibility that the embedment information is embedded over a main subject within a captured image, resulting in the main subject being hidden by the embedment information, in the case where a position (an embedment position) at which the embedment information is embedded is not appropriate. As a measure, a known method of properly determining an appropriate embedment position is a method of determining the embedment position using information included in the image (PTL 1).

An image processing apparatus according to this method detects a main position within an image using information included in the image (such as a focus area, a date stamp, a face position, a text position, and the contour of a subject) and embeds the embedment information at a position other than the main position. By doing so, the image processing apparatus avoids the embedment at the main position within the image and is thus capable of embedding the embedment information into a region other than the main position. Consequently, the image processing apparatus is capable of properly embedding the embedment information in a regular photograph.

Next, it is conceivable to extend the embedment function so that an image containing the embedment information is stereoscopically viewed as a three-dimensional (3D) image. There are two primary ways for generating a 3D image. The first one is a method of generating a 3D image using a disparity between two images, i.e., left and right images, obtained from a stereo camera. The other one is a method of measuring, for each pixel, a distance between the camera and the subject and generating a 3D image based on the distance.

It is to be noted that a value indicating a degree of a depth corresponding to the above-stated disparity or distance is referred to herein as a depth value. In addition, information about the depth value of an image or each pixel in a region of the image is referred to as depth information. For example, a disparity between two images, i.e., left and right images, leads to the depth value of each pixel in these images and the depth information about the depth value of each pixel in these images. Reversely, combining a two-dimensional (2D) image and the depth information indicating the depth value of each pixel in the 2D image leads to two images, i.e., left and right images, which have a disparity.

In PTL 2, a 3D image is generated based on the measured distance, and the depth information is added to the embedment information. This allows the 3D image with the embedment information embedded therein to be viewed stereoscopically. Here, adding appropriate depth information to the embedment information results in the embedment information embedded in the 3D image being displayed in 3D without giving odd impressions.

The method of adding the depth information to the embedment information disclosed in PTL 2 is a method which uses a user interface. In this method, a user presses a "Far" or "Near" button appropriate times to allow appropriate depth information to be added to the embedment information.

The embedment information is embedded in a 3D image based on techniques such as the method of determining an embedment position as disclosed in PTL 1 and the method of adding the depth information to the embedment information as disclosed in PTL 2. However, the embedment into a 3D image has the following multiple problems.

First, there is a possibility that the embedment information embedded in the 3D image is not properly viewable, it is preferred that the embedment information embedded in the 3D image stand out against the background. In order to illustrate this problem, a depth map indicating a depth value of each pixel in an image is described.

Figure 2:
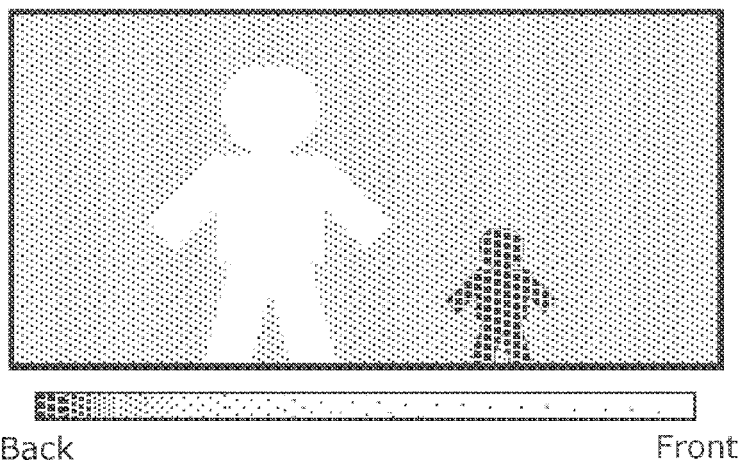
FIG. 2 shows a depth map.

FIG. 2 shows a depth map. The depth map is usually represented by an image of FIG. 2 or the like. In the depth map in FIG. 2, etc., a higher degree of whiteness of a pixel (thinner hatching) denotes a shorter distance from the camera to the subject, and a higher degree of blackness of a pixel (thicker hatching) denotes a longer distance from the camera to the subject. The embedment information embedded in the 3D image is not properly viewed in the case where the depth values surrounding the embedment information indicate a depth equal to or substantially equal to the depth of the embedment information or where the depth values surrounding the embedment information indicate a depth of a position further forward than the embedment information.

Figure 3A:
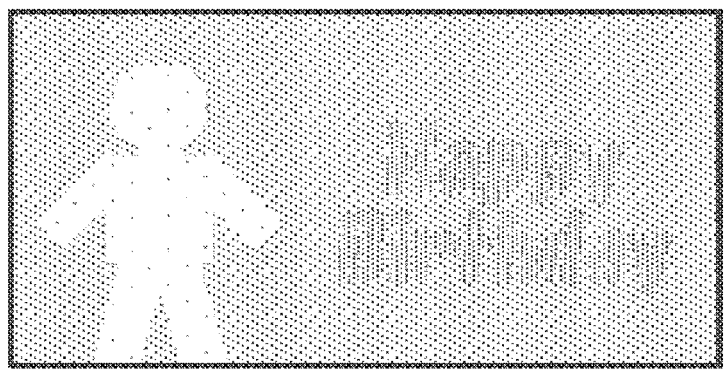
FIG. 3A shows a depth map with inconspicuous embedment information.

For example, in the case where the depth value of the embedment information indicates a depth equal to or substantially equal to surrounding depth values thereof as in the depth map shown in FIG. 3A, the illusionary depth of the embedment information is equal to or substantially equal to that of the surrounding area. Such embedment information gives little effect of illusionary depth, which looks like a scenery flat. In addition, such embedment information is not emphasized and therefore not conspicuous.

Figure 3B:
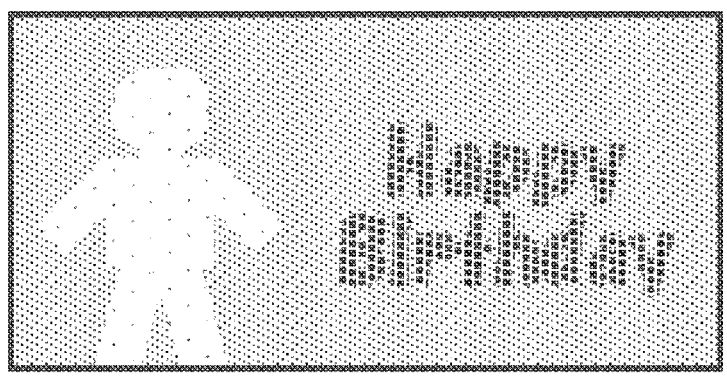
FIG. 3B shows a depth map with embedment info motion which gives an odd impression.

In the case where the depth value of the embedment information indicates a depth of a position further back than the surrounding depth values as in the depth map shown in FIG. 3B, the embedment information is visually present at a back position. Such an image produces an odd impression.

Figure 3C:
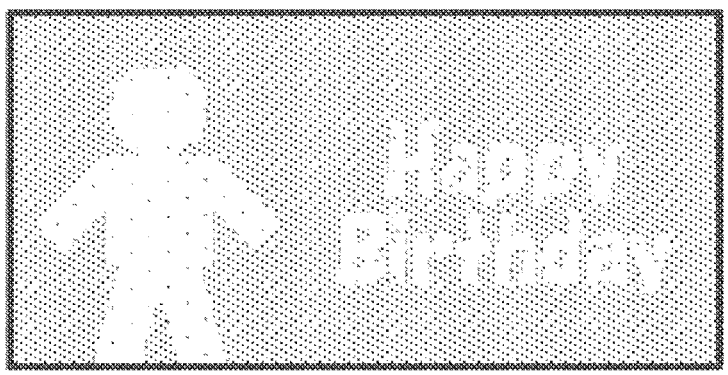
FIG. 3C shows a depth map with embedment information which looks suited.

On the other hand, in the case where the depth value of the embedment information indicates a depth of a position further forward than the surrounding depth values as in the depth map shown in FIG. 3C, the embedment information properly appears to be located in front of the background.

In the method disclosed in PTL 1, the depth value is not used to determine the embedment position. Therefore, there is a possibility that the relationship between the depth value of the embedment information and the depth values surrounding the embedment position is not appropriate, which holds the possibility that the embedment information is not properly viewable. Furthermore, even in the case where a human face is excluded from the embedment position, there is a possibility that the embedment position is set in a region such as a human body or an object held by a person, which makes the image not properly viewable.

In addition, there are cases where setting of the depth information in the embedment information is inconvenient to a user. In PTL 2, the depth information is added to the embedment information using a user interface. This means that upon every use of this function, a user needs to adjust the depth information, which may be troublesome.

Thus, an image processing apparatus according to an aspect of the present invention comprises: an image obtainment unit configured to obtain an image; an embedment information obtainment unit configured to obtain embedment information that is to be embedded into a region within the image; a depth information obtainment unit configured to obtain depth information indicating a depth value of each of pixels in the image; and an embedment region determination unit configured to determine, using the depth information, an embedment region that is the region into which the embedment information is to be embedded.

With this, an image processing apparatus is capable of properly determining a region into which information is to be embedded.

For example, the embedment region determination unit may determine, using the depth information, the embedment region which is made up of a plurality of the pixels each having a depth value indicating a position further back than a position indicated by a predetermined depth value.

By doing so, the image processing apparatus determines a back region as the embedment information. Thus, the image processing apparatus is capable of avoiding the main position within the image being hidden.

Furthermore, for example, it may be that the image processing apparatus further comprises a subject position detection unit configured to detect a subject position in the image, to obtain subject position information indicating the subject position, the subject position being a position of a predetermined subject included in the image, wherein the embedment region determination unit is configured to determine, using the depth information and the subject position information, the embedment region which is made up of a plurality of the pixels each having a depth value indicating a position further back than a position indicated by a depth value of a pixel at the subject position.

By doing so, the image processing apparatus determines, as the embedment information, a region which is further back than a predetermined subject. Thus, the image processing apparatus is capable of avoiding a region equivalent to the predetermined subject being hidden.

Furthermore, for example, the embedment region determination unit may determine, using the depth information, the embedment region which is made up of a plurality of the pixels each having a depth value within a predetermined range from a predetermined depth value.

By doing so, the image processing apparatus determines, as the embedment information, a region having a low degree of variation in depth value. A region having a low degree of variation in depth value is likely to be an inconspicuous region. Therefore, the image processing apparatus is capable of determining, as the embedment region, a region which is likely to be inconspicuous.

Furthermore, for example, the embedment region determination unit may determine, using the depth information, the embedment region which is made up of a plurality of the pixels each having a depth value within a predetermined range from a depth value whose frequency is at a peak.

By doing so, the image processing apparatus is capable of determining, as the embedment region, a region having a depth value the frequency of which is high. The region having a depth value the frequency of which is high is likely to be inconspicuous. Therefore, the image processing apparatus is capable of determining, as the embedment region, a region which is likely to be inconspicuous.

Furthermore, for example, the embedment region determination unit may determine, using the depth information, the embedment region which is made up of a plurality of the pixels each having a depth value indicating a position further back than a position indicated by a predetermined depth value, the depth value being within a predetermined range from a depth value whose frequency is at a peak.

By doing so, the image processing apparatus is capable of determining, as the embedment region, a back region which is likely to be inconspicuous.

Furthermore, for example, the depth information obtainment unit may obtain the depth information which includes information indicating reliability of the depth value of each of the pixels in the image.

By doing so, the image processing apparatus is capable of properly determining the embedment region using depth information including reliability of the depth value of each pixel in the image.

Furthermore, for example, the embedment region determination unit may determine, using the depth information, the embedment region which includes a pixel which has a depth value with reliability lower than predetermined reliability.

By doing so, the image processing apparatus is capable of hiding a region which includes a pixel having a less reliable depth value.

Furthermore, for example, the embedment region determination unit may determine, using the depth information, the embedment region from a region excluding a subject position in the image, the subject position being a position of a predetermined subject included in the image.

By doing so, the image processing apparatus is capable of determining the embedment region from the region excluding a main subject. This means that the image processing apparatus is capable of avoiding the main subject being hidden.

Furthermore, for example, the embedment region determination unit may set a size of the embedment region using an amount of the embedment information obtained by the embedment information obtainment unit, and determine the embedment region which has the set size.

By doing so, the image processing apparatus is capable of properly setting a size of the embedment region based on the embedment information.

Furthermore, for example, the embedment region determination unit may determine the embedment region from a region excluding a subject position in the image, when the embedment region which meets a condition used for determining the embedment region using the depth information is not present, the subject position being a position of a predetermined subject included in the image.

By doing so, even in the case where the embedment region is not determined based on the depth information, the image processing apparatus is capable of determining an embedment region from the region excluding the subject.

Furthermore, for example, the image processing apparatus may further comprise: a depth value determination unit configured to determine a depth value of the embedment information; and an embedment unit configured to embed the embedment information into the embedment region within the image using the depth value determined by the depth value determination unit.

With this, the image processing apparatus is capable of setting a depth value in the embedment information. Therefore, it is possible to obtain the embedment information which is viewed stereoscopically.

Furthermore, for example, the depth value determination unit may determine the depth value of the embedment information to be a depth value of the same degree as a depth value at a subject position in the image, the subject position being a position of a predetermined subject included in the image.

By doing so, the image processing apparatus is capable of setting a depth value in the embedment information so that the embedment information is as conspicuous as the subject.

Furthermore, for example, the depth value determination unit may determine the depth value of the embedment information which is to be embedded into the embedment region determined from a region excluding a subject position in the image, to be a depth value indicating a position further forward than a position indicated by a depth value at the subject position, when the embedment region which meets a condition used for determining the embedment region using the depth information is not present, the subject position being a position of a predetermined subject included in the image.

By doing so, the image processing apparatus is capable of avoiding setting of a depth value which produces an inconspicuous result in the embedment information.

Furthermore, for example, the subject position detection unit may detect, as the subject position in the image, a position of a human face included in the image, to obtain the subject position information which indicates the position of the human face as the subject position.

By doing so, for example, the image processing apparatus determines, as the embedment information, a region which is further back than a face of the subject. Thus, the image processing apparatus is capable of avoiding a region equivalent to the face of the subject being hidden.

Furthermore, for example, the embedment information obtainment unit may obtain the embedment information which includes at least one of text, a decoration part, a frame, and an image.

By doing so, the image processing apparatus is capable of determining an embedment region into which text, a decoration part, a frame, an image, or the like is to be embedded.

Furthermore, for example, it may be that the image processing apparatus further comprises a display unit configured to display the image, wherein the display unit is configured to display a notification message to a user when the embedment region which meets a condition used for determining the embedment region is not present, the notification message indicating that the embedment region is not present.

With this, the image processing apparatus is capable of notifying a user that the region into which the embedment information is to be embedded is not present in the image.

Furthermore, for example, it may be that the embedment region determination unit is configured to determine, using the depth information, whether or not a predetermined subject included in the image is close, when the embedment region which meets the condition used for determining the embedment region is not present, and the display unit is configured to display the notification message which includes a message prompting the user to shoot the subject at a greater distance from the subject, when it is determined that the subject is close.

By doing so, the image processing apparatus is capable of prompting a user to shoot the subject at a greater distance in the case where the region into which the embedment information is to be embedded is not present in the image.

Furthermore, an imaging apparatus according to an aspect of the present invention comprises the above image processing apparatus, and the image obtainment unit is configured to obtain the image by shooting a subject.

With this, the imaging apparatus is capable of properly determining a region for the embedment information to be embedded in the image captured by the shooting.

It is to be noted that these generic or specific aspects may be implemented using a system, a method, an integrated circuit, a computer program, or a non-transitory computer-readable recording medium such as a compact disc read only memory (CD-ROM), and may also be implemented by any combination of systems, apparatuses, methods, integrated circuits, computer programs, or recording media.

The following specifically describes embodiments with reference to the drawings. It is to be noted that each of the embodiments described below shows a general or specific example. The numeral values, shapes, materials, structural elements, the arrangement and connection of the structural elements, steps, the processing order of the steps, etc. shown in the following embodiments are mere examples, and therefore do not limit the present invention. Therefore, among the structural elements in the following embodiments, structural elements not recited in any one of the independent claims defining the broadest concept are described as arbitrary structural elements.

(Embodiment 1)

Figure 4:
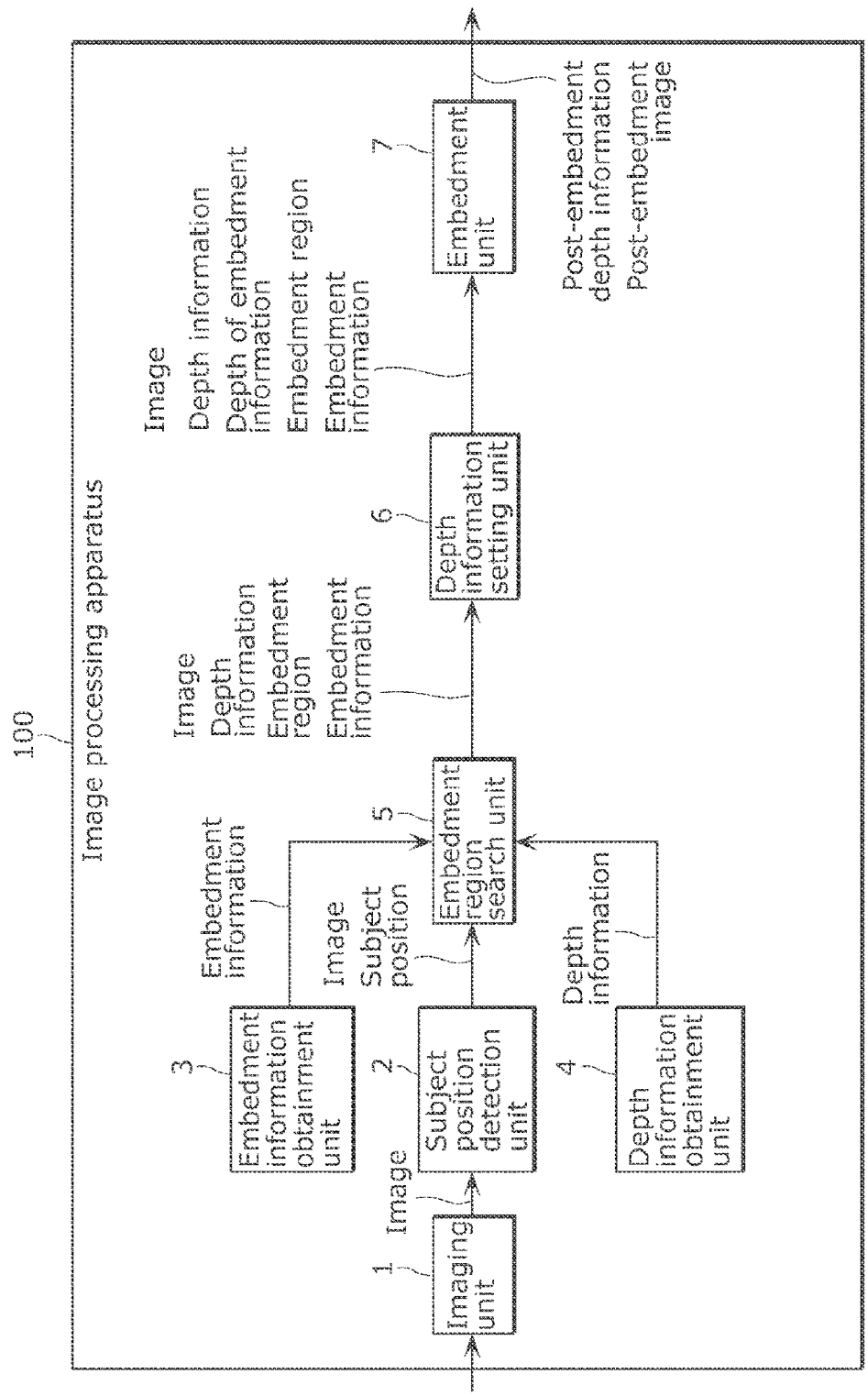
FIG. 4 is a diagram showing a structure of an image processing apparatus according to Embodiment 1.

FIG. 4 shows a structure of an image processing apparatus according to this embodiment, and input information to each structural element in the image processing apparatus. As shown in FIG. 4, an image processing apparatus 100 according to this embodiment includes an imaging unit 1, a subject position detection unit 2, an embedment information obtainment unit 3, a depth information obtainment unit 4, an embedment region search unit 5, a depth information setting unit 6, and an embedment unit 7.

Here, there are two ways for generating a 3D image as mentioned above. The first one is a method of generating a 3D image using a disparity between two images, i.e., left and right images, obtained from a stereo camera. The other one is a method of measuring, for each pixel, a distance between the camera and the subject and generating a 3D image based on the distance. In short, the combination of a 2D image and depth information corresponding to the distance from the camera to the subject generates a 3D image.

In the case where a stereo camera is used, the embedment information is embedded in two images, i.e., left and right images, obtained by the stereo camera shooting a subject. Specifically, the embedment region is determined, then the embedment information is deformed according to a difference between the embedment region in the left image and the embedment region in the right image, and the deformed embedment information is embedded in the two images, i.e., the left and right images.

In particular, this embodiment is applied to the method of generating a 3D image by combining a 2D image and depth information corresponding to a distance from a camera to a subject. However, this embodiment may be applied to the method which uses a stereo camera. Each structural element is described below.

The imaging unit 1 includes a lens unit which incorporates a lens that converges light beams, and an imaging element such as a charge coupled device (CCD) or a complementary metal oxide semiconductor (CMOS). The imaging unit 1 captures an image of a subject and outputs the image.

The subject position detection unit 2 detects, using either one or both of a yet-captured (yet-recorded) image and a captured (recorded) image, a subject position (subject region) that is the position (region) of a main subject within the image. Here, the main subject is a target which should not be covered by the embedment information and is a human face, for example. Furthermore, the main subject may be other than a person, such as an animal or a structural object. In this embodiment, the subject position detection unit 2 detects a human face (face region) as the main subject.

A method of detecting the face region is not limited. A general method may be used to detect the face region. In the case where a plurality of persons is present in the image, the subject position detection unit 2 detects a plurality of face regions. In the case where no persons are present in the image, the subject position detection unit 2 determines that face regions are undetectable. The subject position detection unit 2 then outputs a result of the detection to the embedment region search unit 5.

The embedment information obtainment unit 3 obtains the embedment information which is to be embedded in the image obtained by the imaging unit 1. The embedment information may include text, a decoration part, or an image different from the image obtained by the imaging unit 1.

The embedment information obtainment unit 3 may obtain the embedment information by performing, immediately after the shooting or at the time of editing the image obtained by the shooting, a voice recognition process using a microphone (not shown) supplied with the image processing apparatus 100. Furthermore, the embedment information obtainment unit 3 may obtain the embedment information through an input device (not shown) which acquires user's input. Moreover, the embedment information obtainment unit 3 may have a user select the embedment information from among plural templates prepared in advance.

It is to be noted that the method in which the embedment information obtainment unit 3 obtains the embedment information is not limited to the above-stated method and may be any other method.

The depth information obtainment unit 4 obtains depth information corresponding to either one or both of the yet-captured image and the captured image, and outputs the depth information to the embedment region search unit 5. The depth information includes a depth value of each pixel within the image.

A method of obtaining the depth information includes a method of obtaining the depth information using the time of flight (TOF) technique, or a method of obtaining the depth information using a plurality of images, such as the depth from focus (DFF) technique and the depth from defocus (DFD) technique. The depth information may be obtained by any of these methods.

Furthermore, in the case where the obtained depth information is represented by a depth map, the size of the depth map is preferably the same as, but may be smaller than the size of the captured image. In other words, the resolution of the depth map may be lower than the resolution of the captured image. In addition, the number of tones as the degrees of depth (the number of gradation levels of the hatching in FIG. 2) in the depth map is preferably in the order of 8 to 16 from the perspective of the resolving power for distance, but may be lower than such figures. In this embodiment, the number of tones as the degrees of depth is 256, and the depth values are expressed as 0 to 255.

The embedment region search unit 5 searches for the embedment region into which the embedment information is to be embedded. The following gives examples of the method of searching for the embedment region, which are the cases where the depth maps of FIGS. 5A, 6A, 7A, and 8A are obtained. The method of searching for the embedment region is, however, not limited to the following search methods; other search methods are applicable.

The embedment region search unit 5 searches for the embedment region using subject position information obtained from the subject position detection unit 2 and the depth information obtained from the depth information obtainment unit 4. In searching for the embedment region, the embedment region search unit 5 first obtains a subject position from the subject position information, and then obtains a depth value at the subject position from the depth information.

Figure 5A:
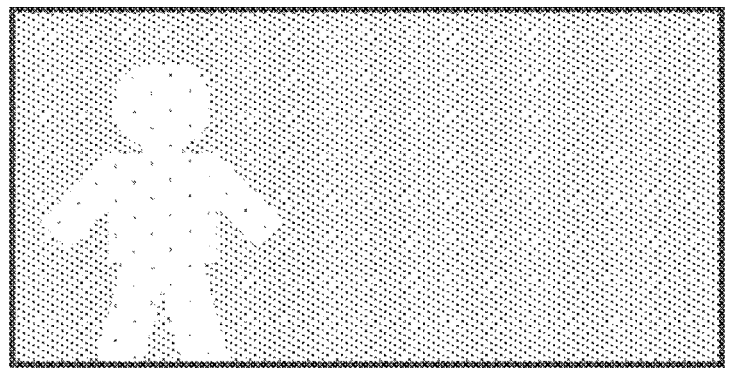
FIG. 5A shows a depth map for an input image according to a first example.
Figure 5B:
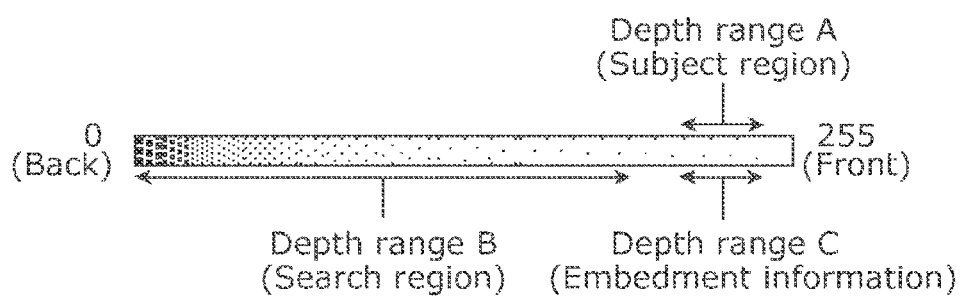
FIG. 5B shows a depth range according to the first example.
Figure 5C:
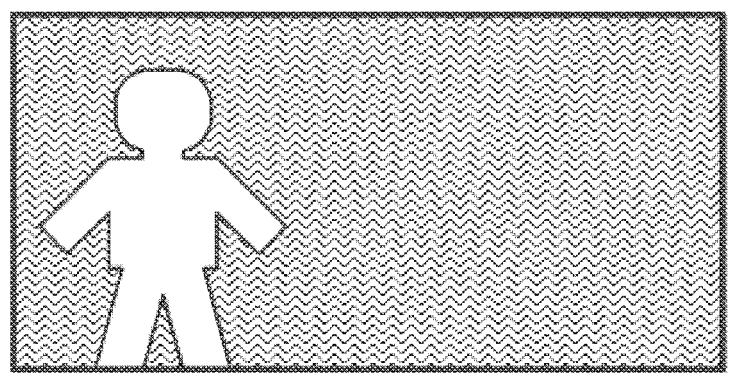
FIG. 5C shows a search region according to the first example.
Figure 5C:

FIG. 5B shows a depth range in the subject position (the subject region). A depth range A shown in FIG. 5B indicates a range of the depth values at the position detected as the subject position by the subject position detection unit 2 (that is, a face position in this embodiment). The embedment region search unit 5 identifies, using the depth information, the depth values at the subject position as falling within the depth range A. The embedment region search unit 5 then searches, for the embedment region, a search region made up of a plurality of pixels each having a depth value in a depth range B which is further back than the depth values at the subject position (FIG. 5C).

The depth value of the embedment information itself is preferably as high as the depth value of the main subject. In addition, the depth value of the vicinity of the embedment region preferably indicates a position further back than the depth value of the embedment information. Therefore, a search region corresponding to the depth range B which indicates a position further back than the depth value at the subject position is searched for the embedment region.

Here, no human body is detected because the subject position detection unit 2 detects a human face. However, the depth value of a face and the depth value of a body are equal or substantially equal. Accordingly, the embedment region search unit 5 is capable of also excluding a body region by excluding a region which has as high a depth value as the depth value of a face. This means that the use of the depth value allows more appropriate setting of the embedment region.

Furthermore, in FIG. 5B, there is a tiny gap between the depth range A including the depth values of the subject region and the depth range B including the depth values of the search region. The wider this gap, the larger the set difference between the depth value of the embedment information and the depth value of the vicinity of the embedment information. The larger this difference, the larger the illusionary depth of the embedment information. The width of this gap is a parameter that determines how conspicuous the embedment information will be, and may be set arbitrarily.

Figure 5D:
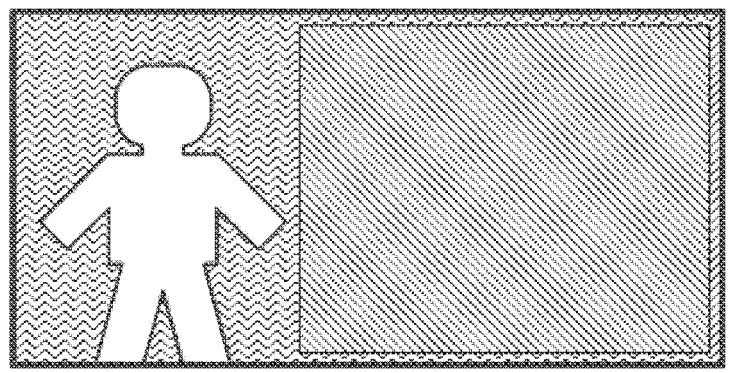
FIG. 5D shows an embedment region according to the first example.
Figure 5D:

The embedment region search unit 5 sets, as the embedment region, a region having an appropriate number of pixels within the search region set as shown in FIG. 5C. The embedment region may have a rectangular shape as shown in FIG. 5D and may alternatively have a different shape than the rectangular shape. Furthermore, the embedment region search unit 5 may search for the embedment region such that the center of gravity of the embedment region and the center of gravity of the plural subject positions detected by the subject position detection unit 2 are included in a predetermined range. The embedment region may be a rectangular region which has a size of the embedment information in the image, and may alternatively be circular in shape, and may alternatively be a mask which represents a shape included in the embedment information.

Furthermore, the embedment region search unit 5 may select, as the embedment region, a region which has depth values within a certain depth range or a region which has depth values within a depth range including the depth value the frequency of which is highest, for example, from the depth range B. This is because, when the image includes a subject (a wall or an object) other than the main subject (a human face), there are cases where the embedment information which does not cover the other subject results in improved viewability. Detailed descriptions are given below with reference to FIGS. 6A to 6C.

Figure 6A:
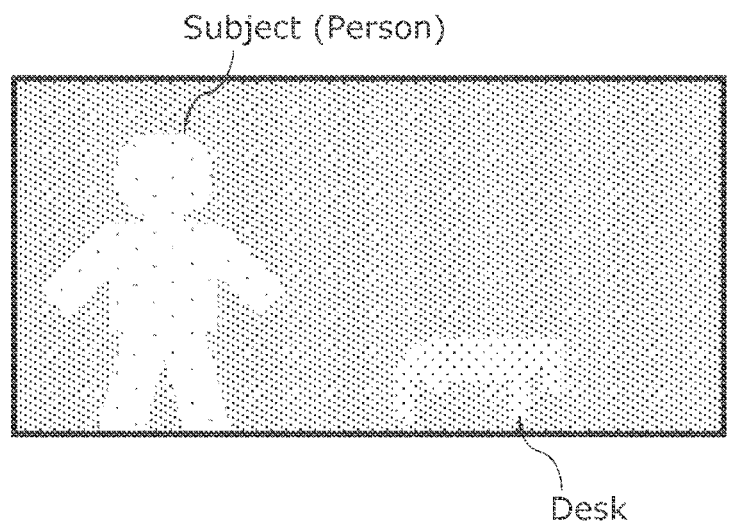
FIG. 6A shows a depth map for an input image according to a second example.
Figure 6B:
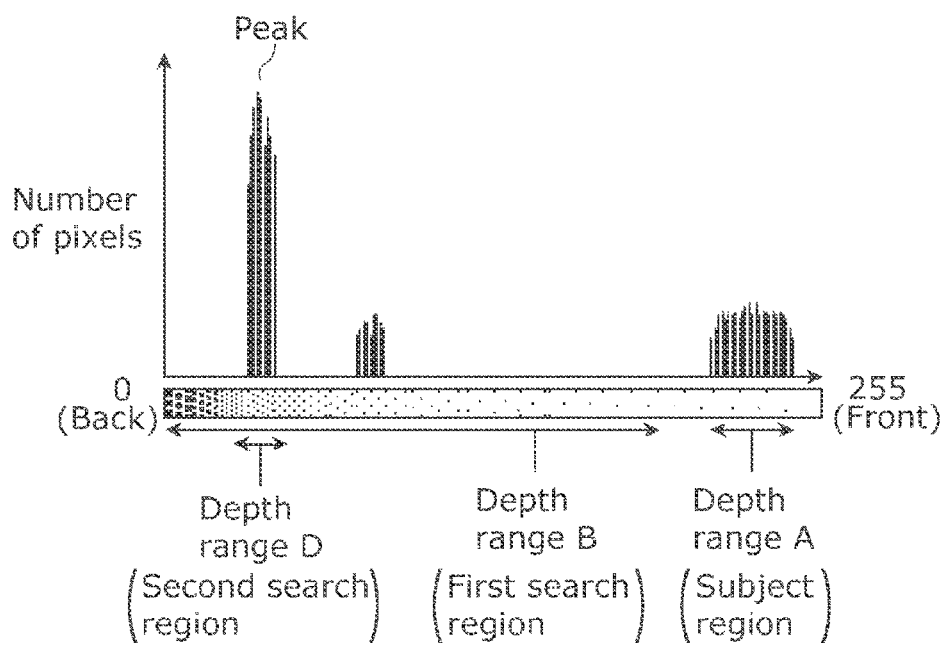
FIG. 6B shows a histogram of depth values according to the second example.

FIG. 6A shows a depth map for an image which includes not only a person but also an object other than the person (a desk in this example). FIG. 6B shows a histogram of depth values included in the depth map of FIG. 6A, where the horizontal axis represents the depth values and the vertical axis represents the number of pixels.

In the case where an object other than a person is included as in FIG. 6A, the embedment region search unit 5 sets, as a first search region, a region which is in the depth range B indicating a position further back than the depth range A (the subject region), shown in the histogram of FIG. 6B. Next, the embedment region search unit 5 sets, as a second search region, a region which is in a depth range D that includes a depth value having the number of pixels at the peak (the local maximum value) in the depth range B.

In the case where a plurality of objects is present within the first search region (the depth range B) that is a region further back than the subject region as in this example, it is preferred that the embedment region search unit 5 search the second search region (the depth range D) for the embedment region.

The second search region corresponding to the depth range D that includes a depth value indicating a peak in the furthest back is presumed to be a background region. Therefore, the embedment region search unit 5 is capable of setting the embedment region from the background region by setting the embedment region from the second search region.

Figure 6C:
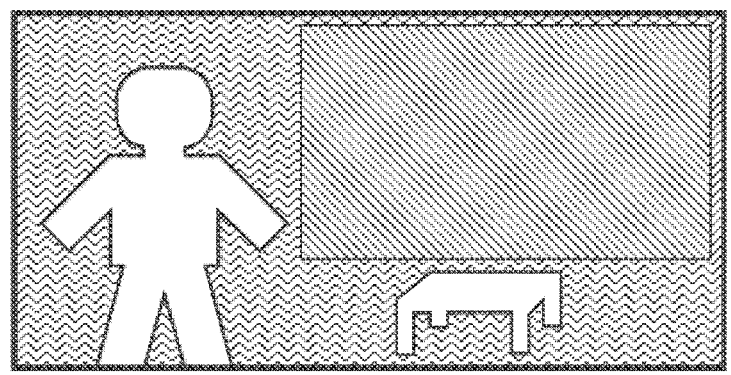
FIG. 6C shows an embedment region according to the second example.
Figure 6C:

FIG. 6C shows an embedment region searched for from the second search region. Specifically, the region of the desk is excluded from the embedment region in FIG. 6C. Thus, the embedment region search unit 5 is capable of properly setting, as the embedment region, a region in which the variation of the depth values is flat in the image.

Figure 7A:
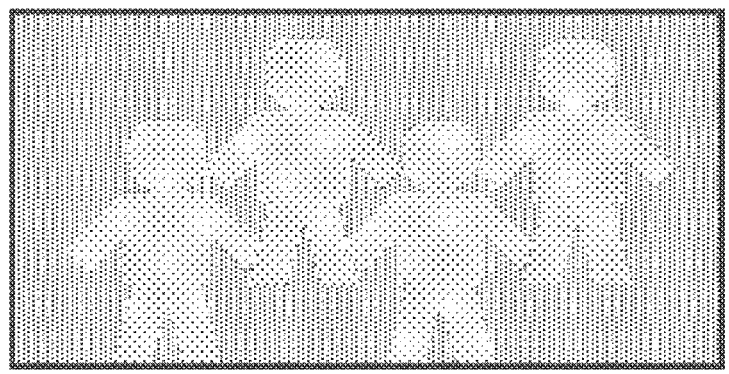
FIG. 7A shows a depth map for an input image according to a third example.
Figure 7B:
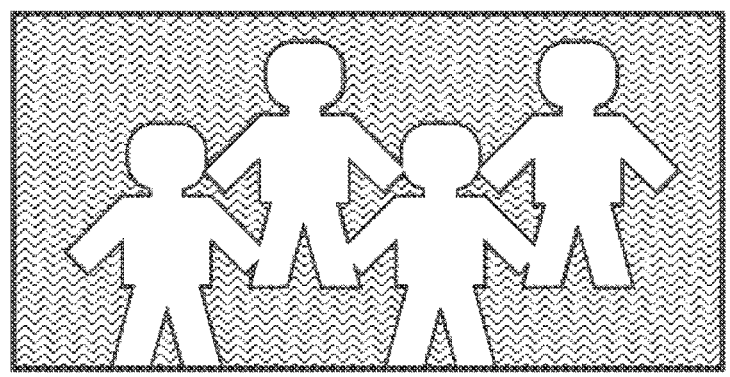
FIG. 7B shows an initial search region according to the third example.
Figure 7B:
Figure 7C:
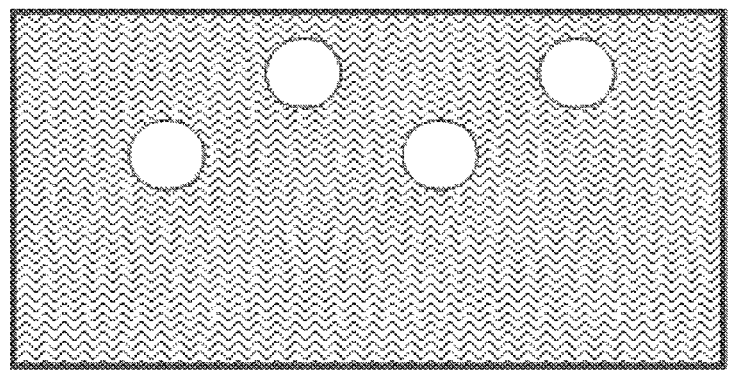
FIG. 7C shows a new search region according to the third example.
Figure 7C:

Furthermore, in the case where the image corresponding to the depth map of FIG. 7A is obtained by the imaging unit 1, the search region for the embedment region is small because there is a plurality of persons in the image (FIG. 7B). In such a case, there is a possibility that the embedment region having an appropriate size cannot be set. Therefore, the embedment region search unit 5 may set the embedment region (FIG. 7D) from the search region excluding face positions (FIG. 7C) that are each a particularly important subject position obtained by the subject position detection unit 2.

Furthermore, it may be that a particular region is displayed in advance on a display unit (not shown) of the image processing apparatus 100. The image processing apparatus 100 may then alert a user so as not to include persons in the particular region when capturing an image using the imaging unit 1 and set, as the embedment region, this particular region determined in advance.

Figure 8A:
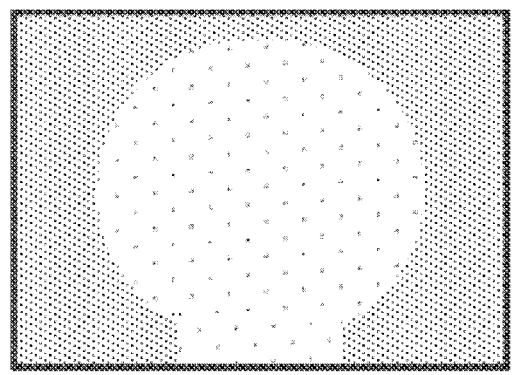
FIG. 8A shows a depth map for an input image according to a fourth example.
Figure 8B:
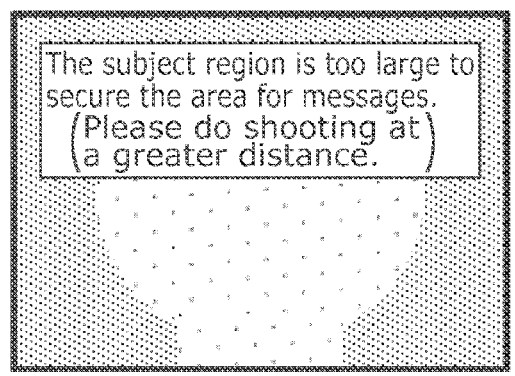
FIG. 8B shows a notification message for shooting according to the fourth example.

Furthermore, in the case where a human face occupies a major part of the image as shown in FIG. 8A, it is difficult to set an appropriate embedment region. In this case, as shown in FIG. 8B, the image processing apparatus 100 may inform a user that the embedment region cannot be set, by displaying that effect in form of an on screen display (OSD), so as to prompt the user for another shooting.

Figure 8C:
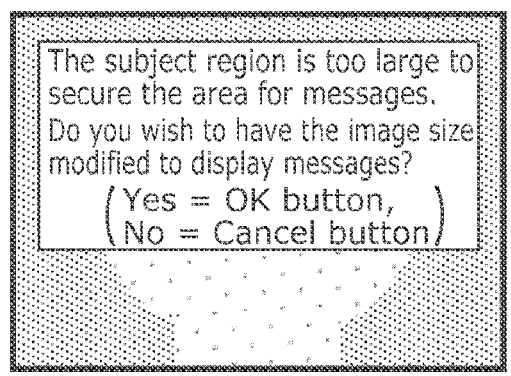
FIG. 8C shows a notification message for correction according to the fourth example.

At this time, the image processing apparatus 100 may determine, using the depth information, whether or not the distance from the imaging unit 1 to the subject is short, and display the need of another shooting at a greater distance in form of an OSD on the display unit when the distance is short. Furthermore, at this time, the image processing apparatus 100 may display a message to induce correction of the image size as shown in FIG. 8C so that the area for the embedment region is secured as shown in FIG. 8D.

The depth information setting unit 6 sets a depth value of the embedment information. In the case where the embedment region is set which has a depth value indicating a position further back than the depth value at the subject position as in FIGS. 5D and 6C, the depth information setting unit 6 sets a depth value included in the depth range C of FIG. 5B and adds, to the embedment information, as high a depth value as the depth value of the human region.

Figure 7D:
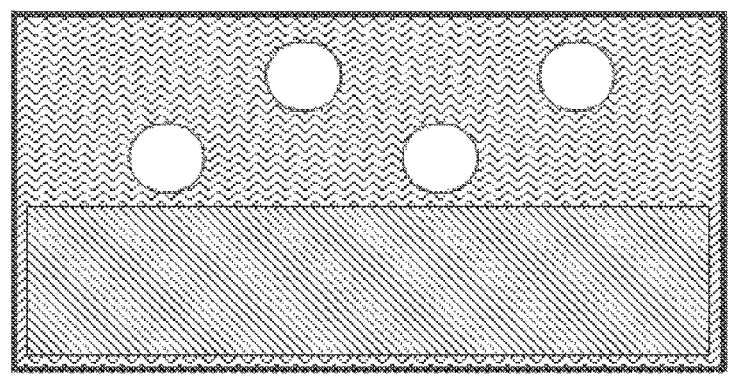
FIG. 7D shows an embedment region according to the third example.
Figure 7D:
Figure 7E:
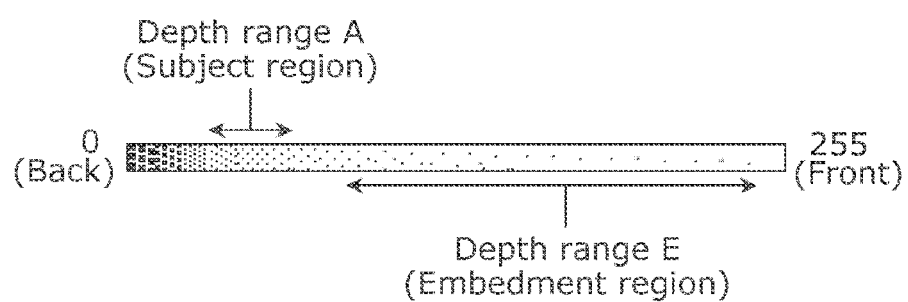
FIG. 7E shows a depth range according to the third example.

In the case where the embedment region is set which includes as high a depth value as the depth value of the human region as in FIG. 7D, the depth information setting unit 6 determines a depth value from a depth range E that is further forward than the depth range A of the subject range as in FIG. 7E, in order to avoid the embedment information becoming inconspicuous. The depth information setting unit 6 then adds the determined depth value to the embedment information (FIG. 7F).

Figure 8D:
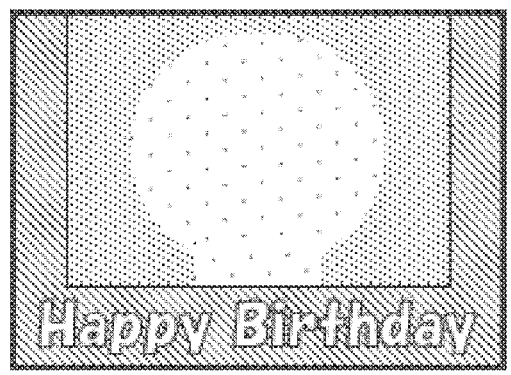
FIG. 8D shows an embedment region according to the fourth example.
Figure 8D:

In the case where the embedment region is set as in FIG. 8D, the depth information setting unit 6 may set the depth value of the embedment region to be equal to or lower (further back) than the depth value in the corrected image. The depth information setting unit 6 may then set the depth value of the embedment information to be higher (further forward) than the depth value in the embedment region.

The embedment unit 7 outputs post-embedment depth information and a post-embedment image using the image obtained by the imaging unit 1, the embedment information obtained by the embedment information obtainment unit 3, the depth information obtained by the depth information obtainment unit 4, the embedment region obtained by the embedment region search unit 5, and the depth value added by the depth information setting unit 6.

Figure 7F:
FIG. 7F shows a post-embedment depth map according to the third example.

The post-embedment depth information is generated by combining the depth information obtained by the depth information obtainment unit 4 and the depth value obtained by the depth information setting unit 6 (e.g., FIGS. 3C and 7F). Likewise, the post-embedment image is generated by combining the image obtained by the imaging unit 1 and the embedment information obtained by the embedment information obtainment unit 3.

Figure 9A:
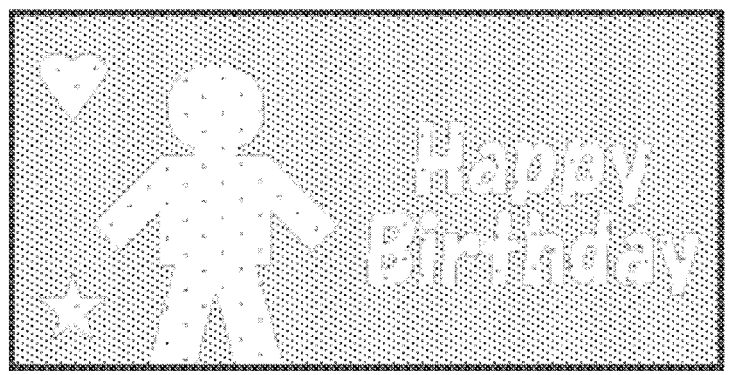
FIG. 9A shows a depth map for an image with decoration parts embedded therein.

It is to be noted that although the embedment information obtained by the embedment obtainment unit 3 is shown as text information in FIGS. 3A to 8D, the embedment information is not limited to text information. For example, the image processing apparatus 100 may attach, as the embedment information, not only text information but also an embedment image, such as a decoration part or a frame preset in the image processing apparatus 100, to the captured image as shown in FIG. 9A. In this case, the image processing apparatus 100 may set a depth value of the embedment image according to the same or like criteria as for the text information and embed the embedment image in the captured image.

Figure 9B:
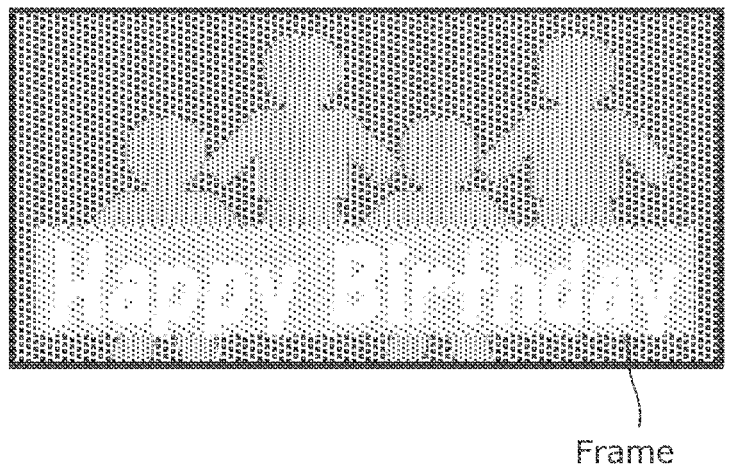
FIG. 9B shows a depth map for an image with a frame embedded therein.

Furthermore, as shown in FIG. 9B, the image processing apparatus 100 may place a decoration frame as a background of text information when embedding the text information.

The image processing apparatus 100 may then set a depth value of the decoration frame and a depth value of the text information such that the depth value of the decoration frame is set between a depth value of a person and the depth value of the text information. The image processing apparatus 100 may then generate an image with the decoration frame and the text information embedded therein.

Figure 9C:
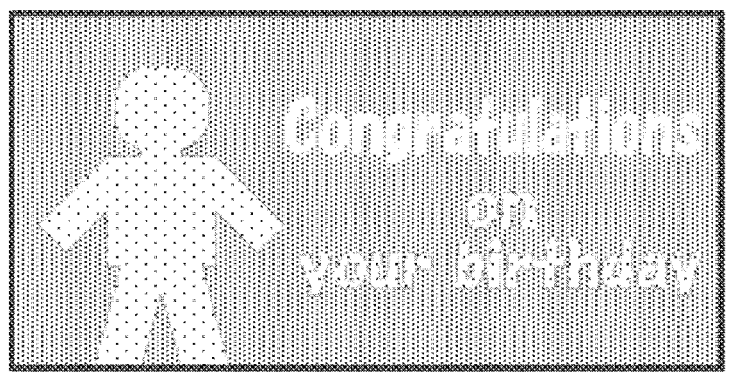
FIG. 9C shows a depth map for an image with text partially emphasized.
Figure 9D:
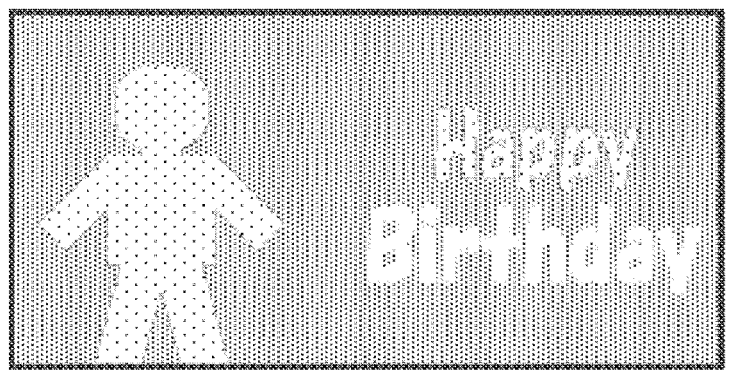
FIG. 9D shows a depth map for an image in which text has been embedded according to power of speech.

Furthermore, the depth value of the embedment information may be other than a constant value. For example, the image processing apparatus 100 may set a depth value such that a word pre-registered in the image processing apparatus 100 will appear in further front (FIG. 9C). Furthermore, in the case of embedding the embedment information using voice recognition, the image processing apparatus 100 may set a depth value of the embedment information according to voice power so that the embedment information will appear in further front when the voice is louder (FIG. 9D).

Furthermore, although the above describes a case of the embedment into a still image, the embedment into a moving image is also possible by performing the same or like processing on each frame. In the embedment into a moving image, the embedment region search unit 5 may adjust a position of the embedment region so that the position of the embedment region is not very different among plural frames.

Figure 10A:
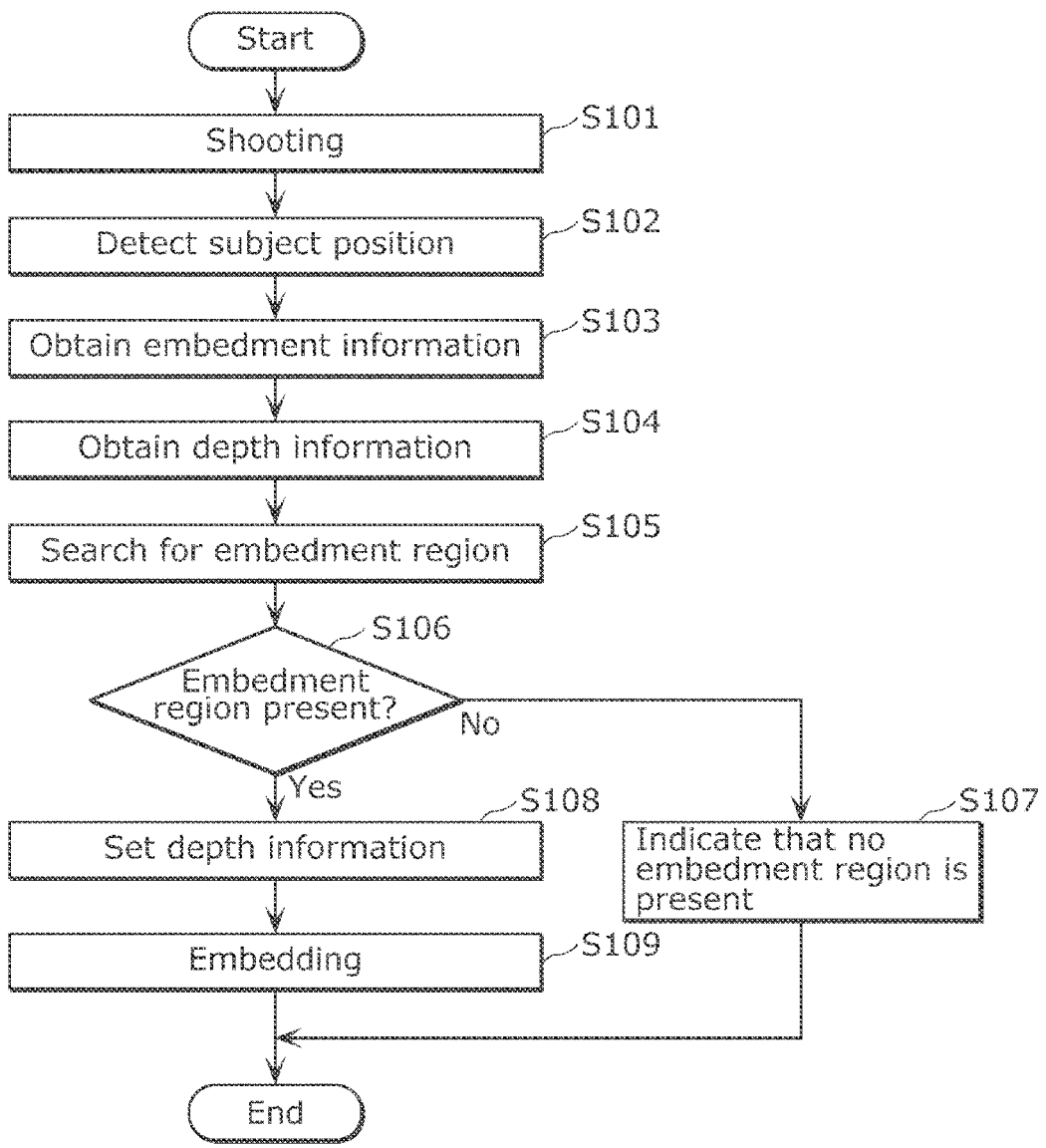
FIG. 10A is a flowchart showing an operation of the image processing apparatus according to Embodiment 1.
Figure 10B:
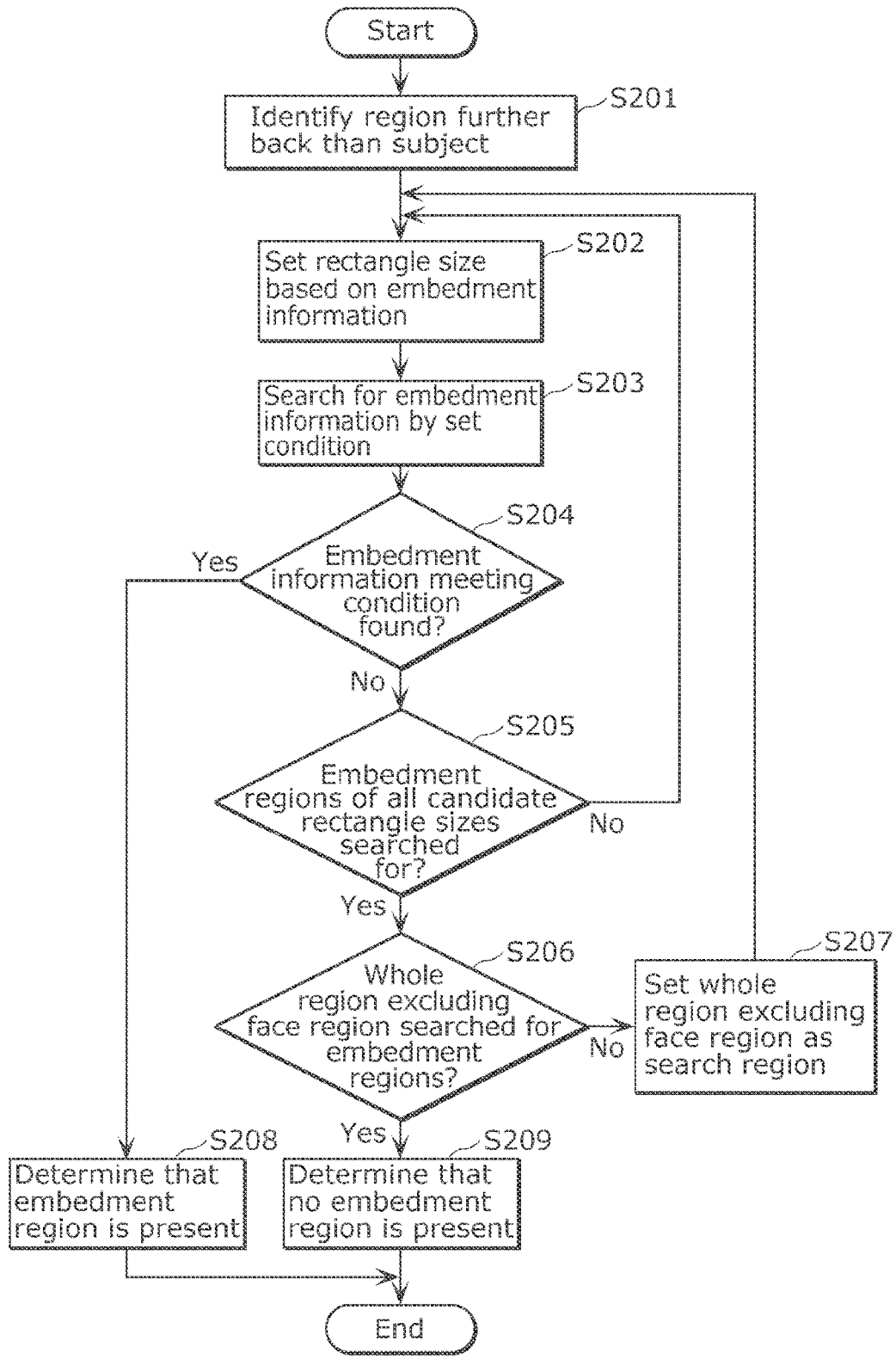
FIG. 10B is a flowchart showing a process of searching for an embedment region according to Embodiment 1.

Next, with reference to FIGS. 10A and 10B, an operation of the image processing apparatus 100 shown in FIG. 4 is described. FIG. 10A shows a flow of the entire processing, and FIG. 10B shows a flow of a process of searching for the embedment region (S105 in FIG. 10A).

The imaging unit 1 generates an image by shooting a subject (S101). The subject position detection unit 2 detects a position of a subject (e.g., a position of a human face) using the image obtained by the imaging unit 1 (S102). The embedment information obtainment unit 3 obtains the embedment information based on voice information, an input from a user, or the like (S103). The depth information obtainment unit 4 obtains depth information corresponding to the image obtained by the imaging unit 1 (S104).

The embedment region search unit 5 obtains, using the depth information obtained by the depth information obtainment unit 4, a depth value at the subject position obtained by the subject position detection unit 2, and identifies a region further back than the position indicated by the depth value at the subject position (S201).

Furthermore, the embedment region search unit 5 sets, based on the embedment information obtained by the embedment information obtainment unit 3, a rectangular shape of the embedment region into which the embedment information is to be embedded (S202).

For example, in the case where the embedment information is text information, the embedment region search unit 5 may set a plurality of candidate rectangular sizes based on the combination of plural preset setting items such as a font size, the number of lines, and an arrangement direction (the vertical or horizontal direction) of the embedment information. In the case where the embedment information is a decoration part or an image, the embedment region search unit 5 may set a plurality of candidate rectangular sizes based on preset plural magnification and/or reduction percentages. The embedment region search unit 5 may then select a rectangular size from among such plural candidates.

The embedment region search unit 5 searches the search region for the embedment region which meets a set condition (S203). The embedment region search unit 5 determines whether or not the embedment region which meets the set condition was found (S204).

Here, in the case where the embedment region which meets the set condition was found, the embedment region search unit 5 determines that the embedment region is present, and ends the search for the embedment region. In the case where the embedment region which meets the set condition was not found, the embedment region search unit 5 determines whether or not the embedment region has been searched for by all the set candidate rectangular sizes (S205). In the case where any of the candidates has not been used in the search, the embedment region search unit 5 sets the unused candidate as another search condition to search for the embedment region (S202 and S203).

In the case where the embedment region has been searched for by all the candidate rectangular sizes, the embedment region search unit 5 determines whether or not, as the search region, the whole region excluding the face region has been searched without using the depth information (see FIG. 7C) (S206).

Specifically, the embedment region search unit 5 firstly searches for the embedment region using the detected face region and the depth information. At this time, a region of a human body or the like is excluded from the search region. In the case where the embedment region which meets the condition was not found, then the embedment region search unit 5 expands the search region.

In the case where the search region excluding the face region has already been searched for the embedment region, the embedment region search unit 5 determines that the embedment region is not present (S209), and ends the search for the embedment region. In the case where the embedment region has not yet been searched for in the search region excluding the face region, the embedment region search unit 5 sets, as the search region, the whole region excluding the face region, using the subject position information (S207). The embedment region search unit 5 then sets a rectangular size again and searches for the embedment region (S202 and S203).

Through the above procedure, the embedment region search unit 5 searches for the embedment region (S105) and determines whether or not the embedment region is present (S106). In the case where it is determined that the embedment region is not present, the image processing apparatus 100 displays in form of an OSD that the embedment region is not present, to prompt a user for another shooting (S107) (see FIG. 8B). In the case where it is determined that the embedment region is present, the depth information setting unit 6 sets depth information for the embedment information (S108).

The depth information setting unit 6 may set a depth value of the embedment information by referring to the depth value of the vicinity of the position at which the embedment information is to be embedded. In the case where the depth value of the vicinity indicates a position further back than the human region, the depth information setting unit 6 sets the depth value of the embedment information to as high a value as the depth value of the human region. In the case where the depth value of the vicinity indicates as large a depth as the depth of the human region, the depth information setting unit 6 sets, for the embedment information, a depth value indicating a position further forward than a position at the depth of the human region. The embedment unit 7 embeds the embedment information after the depth information is set for the embedment information (S109).

Thus, the image processing apparatus 100 according to this embodiment sets, using the depth information, a position at which the embedment information is to be embedded, and a depth value of the embedment information. Consequently, the embedment information is displayed at a more appropriate position without requiring users to perform extra operations.

It is to be noted that in this embodiment, the depth map represented as an image is used as a format for representing the depth information. However, the format for representing the depth information is not limited to such a depth map as described above. Other formats may be used as the format for representing the depth information.

(Embodiment 2)

An image processing apparatus according to this embodiment uses reliability of depth values to determine an embedment region.

Figure 11:
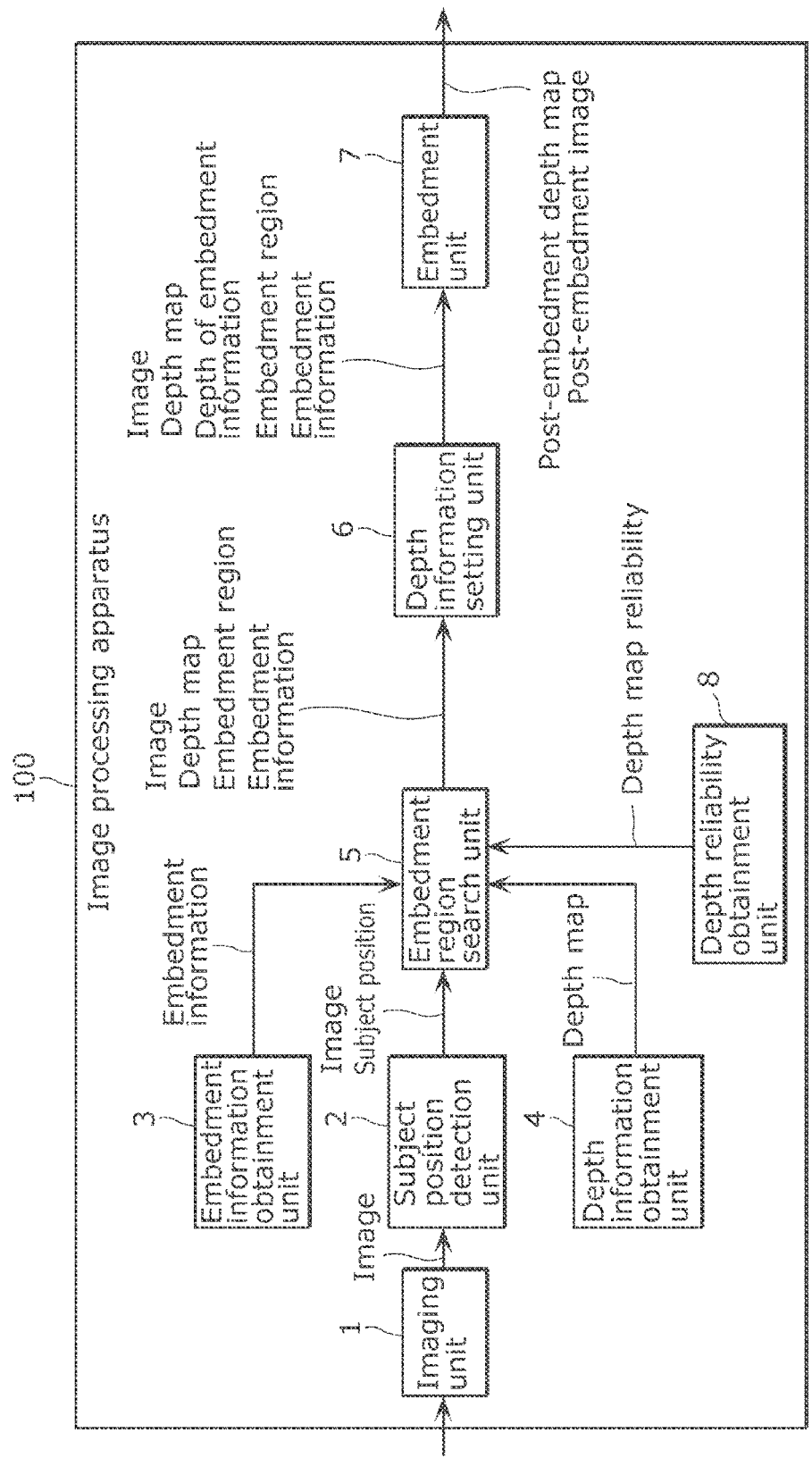
FIG. 11 is a diagram showing a structure of an image processing apparatus according to Embodiment 2.

FIG. 11 shows a structure of the image processing apparatus according to this embodiment. Hereinafter, the same or like structural elements as the structural elements shown in FIG. 4 are denoted by the same numerals and descriptions thereof are omitted to mainly describe structural elements different from the structural elements shown in FIG. 4. As shown in FIG. 11, the image processing apparatus 200 according to this embodiment includes a depth reliability obtainment unit 8 as an additional structural element as compared to the image processing apparatus 100 according to Embodiment 1.

The depth reliability obtainment unit 8 obtains depth reliability that is reliability of the depth map obtained by the depth information obtainment unit 4. The depth map obtained by the depth information obtainment unit 4 usually contains errors. The reliability as to the accuracy of the depth map varies according to a method of obtaining the depth map. There are cases where the depth information obtainment unit 4 fails to obtain correct distance information for some of all the pixels. Therefore, the depth reliability obtainment unit 8 calculates, for each of the pixels, reliability of the depth map in order to estimate an error of the depth map.

For example, when generating a depth map from left and right images captured by a stereo camera, the depth information obtainment unit 4 determines a relationship of correspondence between the left image and the right image using a pixel-to-pixel or block-to-block difference in pixel value. When the difference is small, the degree of pixel or block matching is high between the two images, i.e., the left and right images. In this case, the depth reliability obtainment unit 8 determines that the reliability of the depth value of the current pixel or block is high. On the other hand, when the difference is large, the depth reliability obtainment unit 8 determines that the reliability of the depth value of the current pixel or block is low.

In short, on the basis of a difference between a pixel value in the left image and a pixel value in the right image, the depth reliability obtainment unit 8 calculates reliability that is higher when the difference is lower.

Furthermore, for example, the depth reliability obtainment unit 8 may determine that the reliability is low when the depth value is not within a predetermined range. In this case, on the basis of the depth value of each pixel in the image, the depth reliability obtainment unit 8 calculates reliability that is lower when the deviation from the predetermine range is larger. Furthermore, the depth reliability obtainment unit 8 may determine that the reliability is low when the difference in depth value between neighboring pixels is large. In this case, on the basis of a level of the difference, the depth reliability obtainment unit 8 calculates reliability that is lower when the difference is larger.

Figure 12A:
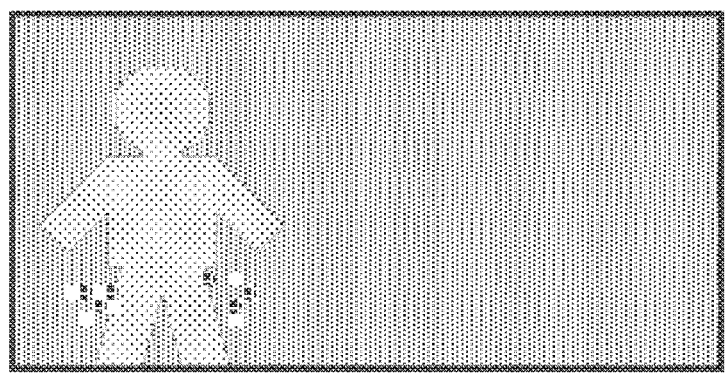
FIG. 12A shows a depth map for an input image according to Embodiment 2.
Figure 12B:
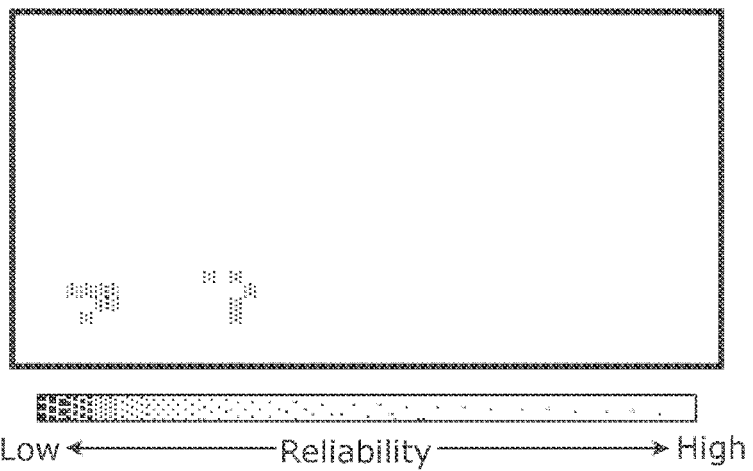
FIG. 12B shows depth map reliability according to Embodiment 2.

FIG. 12A shows the depth map obtained by the depth information obtainment unit 4. The depth map shown in FIG. 12A contains some erroneous depth values on and around a person. FIG. 12B shows depth map reliability corresponding to the depth map shown in FIG. 12A.

The depth map reliability in FIG. 12B is indicated in such a way that a higher degree of whiteness (thinner hatching) denotes higher reliability of the depth value at the corresponding pixel position, and a higher degree of blackness (thicker hatching) denotes lower reliability of the depth value at the corresponding pixel position. When the reliability of the depth value is low, the possibility that the depth value is an error is high. The depth reliability obtainment unit 8 obtains the depth map reliability of FIG. 12B or the like and outputs the depth map reliability to the embedment region search unit 5.

The embedment region search unit 5 preferentially determines, as the embedment region, a region having a depth value with low reliability, using the depth map reliability. However, even in the case where the reliability of the depth value at the subject position (e.g., the position of a human face) obtained by the subject position detection unit 2 is low, the embedment region search unit 5 may determine an embedment region from the region other than the subject position. Furthermore, the embedment region search unit 5 may detect the position of the center of gravity of a region having a depth value with low reliability and determine a position, a size, and a shape of the embedment region so as to conform that position of the center of gravity to the center of the embedment region.

Figure 12C:
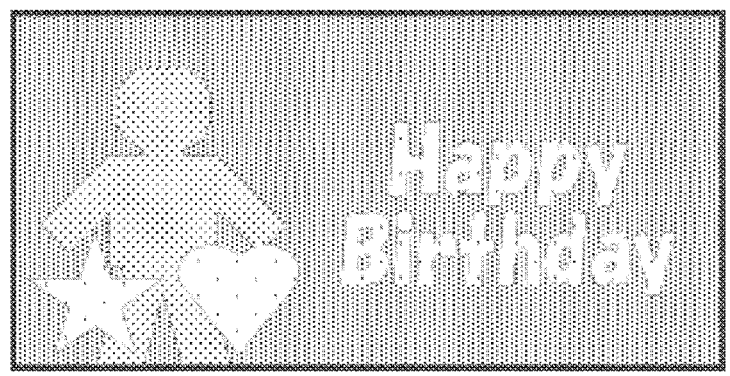
FIG. 12C shows a first example of a post-embedment depth map according to Embodiment 2.
Figure 12D:
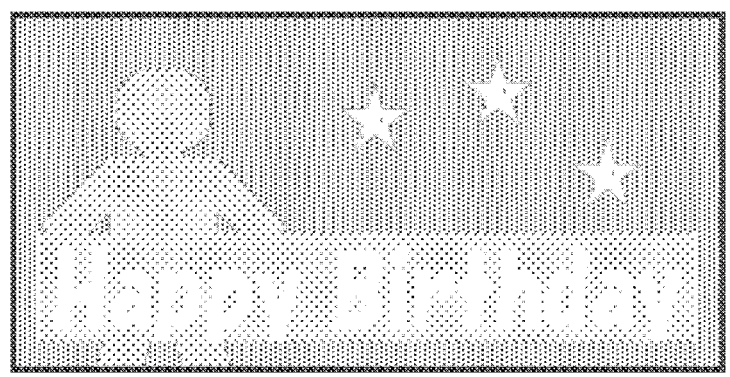
FIG. 12D shows a second example of the post-embedment depth map according to Embodiment 2.

FIGS. 12C and 12D each show a state where the embedment information is embedded into the embedment region determined using the depth map reliability shown in FIG. 12B. Thus, the embedment information is embedded preferentially into a region having a depth value with low reliability. Therefore, a region having a depth value which is highly likely to be erroneous is hidden. In other words, the image processing apparatus 200 is capable of generating an appropriate 3D image by hiding a region inappropriate as a 3D image.

As above, the image processing apparatus 200 according to this embodiment is capable of generating an appropriate 3D image by setting the embedment position of the embedment information to be in a region having a depth value with low reliability.

it is to be noted that in this embodiment, the depth map reliability represented as an image is used as a format for representing the reliability of depth values. However, the format for representing the reliability of depth values is not limited to the above format. Other formats may be used as the format for representing the reliability of depth values.

Furthermore, Embodiment 1 and Embodiment 2 may be combined. For example, a region with low reliability in the back region may be set as the embedment region. Moreover, in the case where the region with low reliability is not present, the back region may be set as the embedment region. It is possible to combine various conditions about the embedment region indicated in Embodiments 1 and 2.

(Embodiment 3)

In this embodiment, the characteristic structures and procedures described in Embodiments 1 and 2 are described for confirmation.

Figure 13:
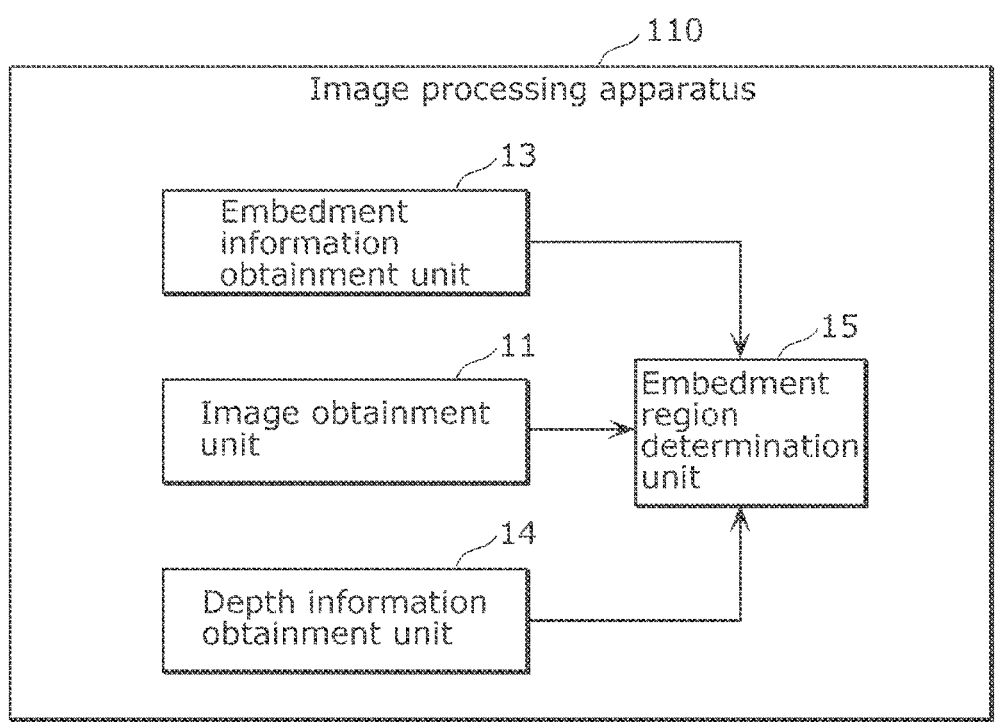
FIG. 13 is a diagram showing a structure of an image processing apparatus according to Embodiment 3.

FIG. 13 shows a structure of an image processing apparatus according to this embodiment. As shown in FIG. 13, an image processing apparatus 110 according to this embodiment includes an image obtainment unit 11, an embedment information obtainment unit 13, a depth information obtainment unit 14, and an embedment region determination unit 15.

The image obtainment unit 11 obtains an image. For example, the image obtainment unit 11 corresponds to the imaging unit 1 according to Embodiments 1 and 2.

The embedment information obtainment unit 13 obtains embedment information. The embedment information is information to be embedded into a region within the image. For example, the embedment information obtainment unit 13 corresponds to the embedment information obtainment unit according to Embodiments 1 and 2.

The depth information obtainment unit 14 obtains depth information. The depth information indicates a depth value of each pixel in the image. For example, the depth information obtainment unit 14 corresponds to the depth information obtainment unit 4 according to Embodiments 1 and 2.

The embedment region determination unit 15 determines an embedment region using the depth information. The embedment region is a region into which the embedment information is embedded. For example, the embedment region determination unit 15 corresponds to the embedment region search unit 5 according to Embodiments 1 and 2.

Figure 14:
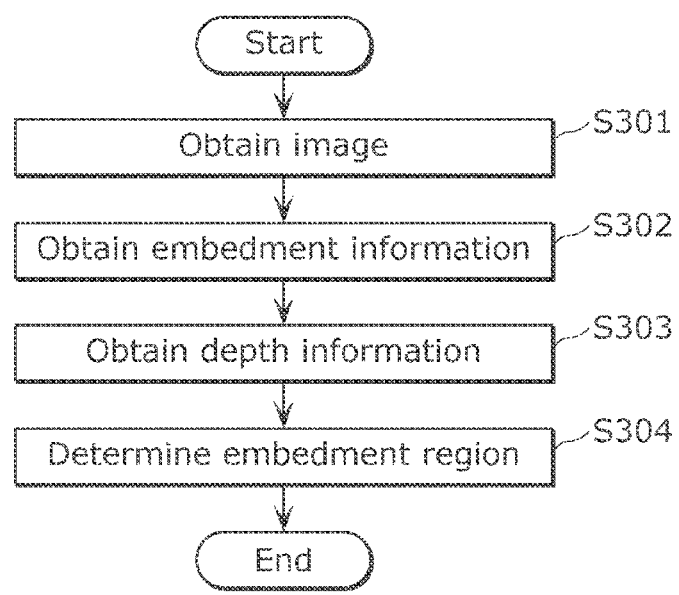
FIG. 14 is a flowchart showing an operation of the image processing apparatus according to Embodiment 3.

FIG. 14 is a flowchart showing an operation of the image processing apparatus 110 shown in FIG. 13. Firstly, the image obtainment unit 11 obtains an image (S301). Next, the embedment information obtainment unit 13 obtains embedment information (S302). Next, the depth information obtainment unit 14 obtains depth information (S303). Lastly, the embedment region determination unit 15 determines an embedment region using the depth information (S304).

With the above-described structure and procedure, the image processing apparatus 110 is capable of properly determining a region into which information is to be embedded.

(Embodiment 4)

In this embodiment, as in the case of Embodiment 3, the characteristic structures and procedures described in Embodiments 1 and 2 are described for confirmation. This embodiment includes structures and procedures which are arbitrarily added to Embodiment 3.

Figure 15:
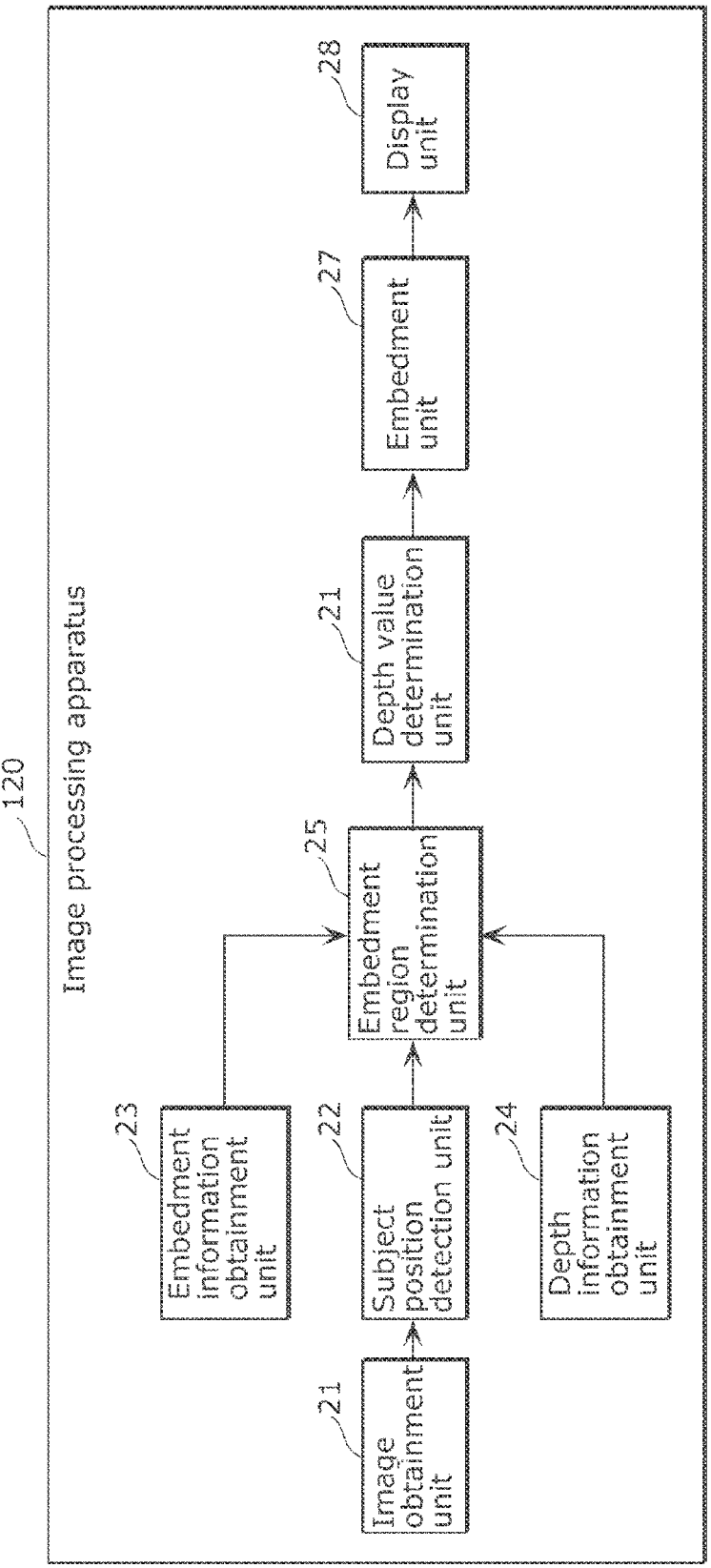
FIG. 15 is a diagram showing a structure of an image processing apparatus according to Embodiment 4.

FIG. 15 shows a structure of an image processing apparatus according to this embodiment. As shown in FIG. 15, an image processing apparatus 120 according to this embodiment includes an image obtainment unit 21, a subject position detection unit 22, an embedment information obtainment unit 23, a depth information obtainment unit 24, an embedment region determination unit 25, a depth value determination unit 26, an embedment unit 27, and a display unit 28.

The image obtainment unit 21 obtains an image. For example, the image obtainment unit 21 corresponds to the imaging unit 1 according to Embodiment 1, the imaging unit 1 according to Embodiment 2, and the image obtainment unit 21 according to Embodiment 3.

The subject position detection unit 22 detects a subject position and thereby obtains subject position information indicating the subject position. The subject position is a position in the image at which a predetermined subject included in the image is located. For example, the subject position detection unit 22 corresponds to the subject position detection unit 2 according to Embodiment 1 and the subject position detection unit 2 according to Embodiment 2.

The embedment information obtainment unit 23 obtains embedment information. The embedment information is information to be embedded into a region within the image. For example, the embedment information obtainment unit 23 corresponds to the embedment information obtainment unit 3 according to Embodiment 1, the embedment information obtainment unit 3 according to Embodiment 2, and the embedment information obtainment unit 13 according to Embodiment 3.

The depth information obtainment unit 24 obtains depth information. The depth information indicates a depth value of each pixel in the image. For example, the depth information obtainment unit 24 corresponds to the depth information obtainment unit 4 according to Embodiment 1, the depth information obtainment unit 4 according to Embodiment 2, and the depth information obtainment unit 14 according to Embodiment 3.

The embedment region determination unit 25 determines an embedment region using the depth information. The embedment region is a region into which the embedment information is embedded. For example, the embedment region determination unit 25 corresponds to the embedment region search unit 5 according to Embodiment 1, the embedment region search unit 5 according to Embodiment 2, and the embedment region determination unit 15 according to Embodiment 3.

The depth value determination unit 26 determines a depth value of the embedment information. The depth value determination unit 26 corresponds to the depth information setting unit 6 according to Embodiment 1 and the depth information setting unit 6 according to Embodiment 2.

The embedment unit 27 embeds the embedment information into the embedment region using the depth value determined by the depth value determination unit 26. The embedment unit 27 corresponds to the embedment unit 7 according to Embodiment 1 and the embedment unit 7 according to Embodiment 2.

The display unit 28 displays an image. The display unit 28 may display the image obtained by the image obtainment unit 21 and may alternatively display the image with the embedment information embedded therein by the embedment unit 27. The display unit 28 may display an OSD according to Embodiment 1.

Figure 16:
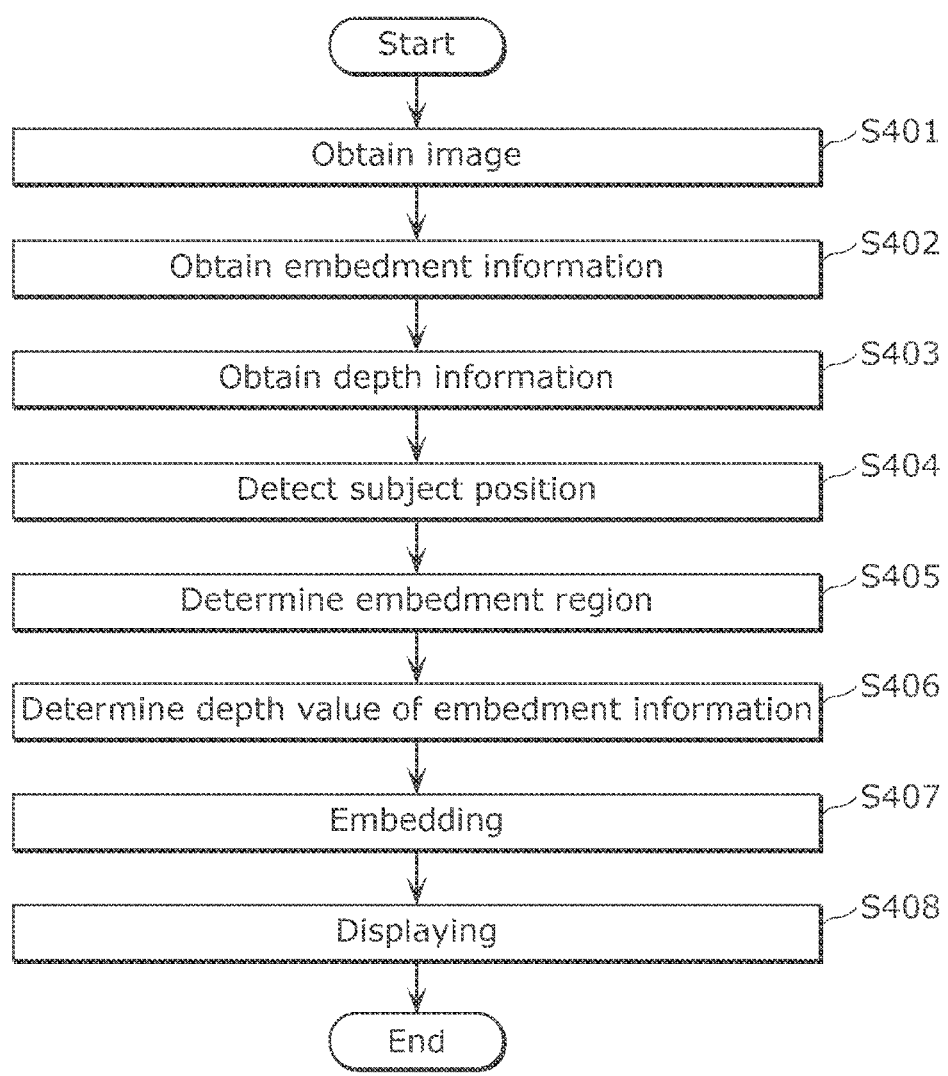
FIG. 16 is a flowchart showing an operation of the image processing apparatus according to Embodiment 4.

FIG. 16 is a flowchart showing an operation of the image processing apparatus 120 shown in FIG. 15. Firstly, the image obtainment unit 21 obtains an image (S401). Next, the embedment information obtainment unit 23 obtains embedment information (S402). Next, the depth information obtainment unit 24 obtains depth information (S403). Next, the subject position detection unit 22 detects a subject position and thereby obtains subject position information indicating the subject position (S404).

Next, the embedment region determination unit 25 determines an embedment region using the depth information (S405). Next, the depth value determination unit 26 determines a depth value of the embedment information (S406). Next, the embedment unit 27 embeds the embedment information into the embedment region using the depth value determined by the depth value determination unit 26 (S407). Lastly, the display unit 28 displays the image with the embedment information embedded therein by the embedment unit 27 (S408).

With the above-described structure and procedure, the image processing apparatus 120 is capable of properly determining a region into which information is to be embedded.

It is to be noted that the embedment region determination unit may determine the embedment region using the depth information and the subject position information. Furthermore, the embedment region determination unit 25 may determine, as the embedment region, a region made up of a plurality of pixels each having a depth value indicating a position further back than a position indicated by a predetermined depth value. The predetermined depth value may be a depth value of a pixel at the subject position.

Furthermore, the embedment region determination unit 25 may determine, as the embedment region, a region made up of a plurality of pixels each having a depth value within a predetermined range from a predetermined depth value. The predetermined depth value may be a depth value the frequency of which is at a peak and may alternatively be a depth value the frequency of which is at a peak in the furthest back. The embedment region determination unit 25 may determine, as the embedment region, a region made up of a plurality of pixels each having a depth value within a predetermined range from a depth value the frequency of which is at a peak, among a plurality of pixels which have depth values each indicating a position further back than a position indicated by a predetermined depth value.

The depth information obtainment unit 24 may obtain depth information which includes information indicating reliability of the depth value of each pixel in the image. Furthermore, the embedment region determination unit 25 may determine, as the embedment region, a region which includes a pixel having a depth value with reliability lower than predetermined reliability.

The embedment region determination unit 25 may set a size of the embedment region using an amount of the embedment information obtained by the embedment information obtainment unit 23. The embedment region determination unit 25 may then determine the embedment region of the set size.

The embedment region determination unit 25 may determine the embedment region using the depth information from a region excluding the subject position. The embedment region determination unit 25 may determine the embedment region from the region excluding the subject position without using the depth information when the embedment region meeting the condition used for determining the embedment region using the depth information is not present. In this case, the depth value determination unit 26 may determine the depth value of the embedment information to be a depth value indicating a position further forward than the position indicated by the depth value at the subject position.

The depth value determination unit 26 may determine the depth value of the embedment information to be a depth value of the same degree as a depth value at the subject position. The depth value determination unit 26 may determine the depth value of the embedment information to be a depth value within a predetermined range from the depth value at the subject position.

The subject may be a human face. The embedment information may include at least one of text, a decoration part, a frame, and an image.

The display unit 28 may display, to a user, a notification message indicating that the embedment region is not present when the embedment region meeting the condition used for determining the embedment region is not present.

The display unit 28 may display a notification message which includes a message prompting a user to shoot a subject at a greater distance from the subject. The display unit 28 may display such a message when the embedment region meeting the condition used for determining the embedment region is not present and when the depth value of the pixel at the subject position indicates a position further forward than the position indicated by a predetermined depth value.

The embedment region determination unit 25 may determine, using the depth information, whether or not a predetermined subject included in the image is close when the embedment region meeting the condition used for determining the embedment region is not present. For example, the embedment region determination unit 25 determines that the subject is close when the depth value of the pixel at the subject position indicates a position further forward than the position indicated by the predetermined depth value. The display unit 28 may display a notification message which includes a message prompting a user to shoot the subject at a greater distance from the subject when it is determined that the subject is dose.

The image processing apparatus 120 may be an imaging apparatus such as a camera and may alternatively be a part of the imaging apparatus. The image obtainment unit 21 may obtain an image by shooting a subject.

It is to be noted that an embodiment according to the present invention may be implemented as an apparatus and may also be implemented as a method which includes, as steps, processing units included in the apparatus. Furthermore, an embodiment according to the present invention may be implemented as a program which causes a computer to execute these steps and may also be implemented as a non-transitory computer-readable recording medium, such as CD-ROM, on which the program is recorded.

Furthermore, an embodiment according to the present invention may be implemented as information, data, or signals indicating the program. These program, information, data, and signals may be distributed via a communication network such as the Internet.

(Other Variations)

An embodiment according to the present invention is not limited to the above embodiments. An embodiment according to the present invention may be the following embodiment.

(1) Each of the above image processing apparatuses is specifically a computer system which includes a microprocessor, a read only memory (ROM), a random access memory (RAM), a hard disk unit, a display unit, a keyboard, a mouse, and so on.

In the RAM or the hard disk unit, a computer program is stored. When the microprocessor operates according to the computer program, the image processing apparatus achieves its functions. Here, the computer program is composed of command codes each indicating an instruction which is given to a computer in order to achieve a predetermined function.

(2) Part or all of the structural elements included in the above image processing apparatus may be provided as one system LSI (large scale integration). The system LSI is a super multifunctional LSI manufactured by integrating plural components into one chip and is specifically a computer system which includes a microprocessor, a ROM, a RAM, and so on.

In the RAM, a computer program is stored. When the microprocessor operates according to the computer program, the system LSI achieves its functions.

(3) Part or all of the structural elements included in the above image processing apparatus may be provided as an IC card or a stand alone module that can be attached to and detached from the image processing apparatus. The IC card or the module is a computer system which includes a microprocessor, a ROM, a RAM, and so on.

The IC card or the module may include the above super multifunctional LSI. When the microprocessor operates according to a computer program, the IC card or the module achieves its functions. This IC card or this module may be anti-tamper.

(4) An embodiment according to the present invention may be the method described above. Furthermore, an embodiment according to the present invention may be a computer program which implements the method using a computer, or digital signals including the computer program.

Furthermore, an embodiment according to the present invention may be a computer-readable recording medium, such as a flexible disk, a hard disk, a CD-ROM, a magneto-optical drive (MO), a digital versatile disc (DVD), a DVD-read only memory (DVD-ROM), a DVD-random access memory (DVD-RAM), a Blu-ray Disc (BD), or a semiconductor memory, on which the computer program or the digital signals are recorded. Furthermore, an embodiment according to the present invention may be the digital signals recorded on these recording media.

Furthermore, an embodiment according to the present invention may be an embodiment which transmits the computer program or the digital signals via telecommunication lines, wireless or wired communication lines, networks represented by the Internet, data broadcasting, or the like.

Furthermore, an embodiment according to the present invention may be a computer system which includes a microprocessor and a memory. It may then be that the above computer program is stored in the memory and that the microprocessor operates according to the computer program.

Furthermore, the program or the digital signals may be recorded on the recording medium and thus transferred, or may alternatively be transferred via the network or the like. An embodiment according to the present invention may then be implemented by another independent computer system.

(5) The above embodiments and the above variations may be combined.

It is to be noted that in each of the above embodiments, each structural element may be constituted by dedicated hardware or achieved by executing a software program suited to the structural element. Each structural element may be achieved by a program execution unit such as a CPU or a processor executing a software program recorded on a recording medium such as a hard disk or a semiconductor memory. Here, the software which achieves the image processing apparatus according to each of the above embodiments is the following program.

Specifically, this program causes a computer to execute an image processing method comprising: obtaining an image; obtaining embedment information that is to be embedded into a region within the image; obtaining depth information indicating a depth value of each of pixels in the image; and determining, using the depth information, an embedment region that is the region into which the embedment information is to be embedded.

The structural elements may be circuits. These circuits may form a single circuit as a whole or may alternatively form separate circuits. In addition, these circuits may each be a general-purpose circuit or may alternatively be a dedicated circuit.

Although the image processing apparatus according to one or more aspects of the present invention has been described above based on the embodiments, the present invention is not limited to these embodiments. Various modifications to the present embodiments that can be conceived by those skilled in the art, and forms configured by combining structural elements in different embodiments without departing from the teachings of the present invention may be included in the scope of one or more of the aspects of the present invention.

For example, in each of the above embodiments, the process which is executed by a particular processing unit may be executed by another processing unit. Furthermore, the order of plural processes may be changed, and the plural processes may be executed in parallel.

INDUSTRIAL APPLICABILITY

The present invention is useful to embed information in an image and is applicable, for example, to digital still cameras, digital video cameras, household or professional imaging apparatuses, digital photo frames, television receivers, mobile devices, mobile phones, or the like,

REFERENCE SIGNS LIST

1 Imaging unit
2, 22 Subject position detection unit
3, 13, 23 Embedment information obtainment unit
4, 14, 24 Depth information obtainment unit
5 Embedment region search unit
6 Depth information setting unit
7, 27 Embedment unit
8 Depth reliability obtainment unit
11, 21 Image obtainment unit
15, 25 Embedment region determination unit
26 Depth value determination unit
28 Display unit
100, 110, 120, 200 Image processing apparatus

The invention claimed is:

1. An image processing apparatus comprising:
a microprocessor;
an image obtainment unit configured to obtain an image;
an embedment information obtainment unit configured to obtain embedment information that is to be embedded into a region within the image;
a depth information obtainment unit configured to obtain depth information indicating a depth value of each of pixels in the image;
an embedment region determination unit configured to:
set, using the depth information, a search region that is a portion of the image and made up of a plurality of the pixels each having a depth value indicating a position further back than a position indicated by a predetermined depth value; and
determine, in the portion that is the set search region, an embedment region that is the region into which the embedment information is to be embedded; and
a display unit configured to display the image,
wherein the display unit is configured to display a notification message to a user when the embedment region which meets a condition used for determining the embedment region is not present, the notification message indicating that the embedment region is not present.

2. The image processing apparatus according to claim 1, further comprising
a subject position detection unit configured to detect a subject position in the image, to obtain subject position information indicating the subject position, the subject position being a position of a predetermined subject included in the image,
wherein the embedment region determination unit is configured to determine, using the depth information and the subject position information, the embedment region which is made up of a plurality of the pixels each having a depth value indicating a position further back than a position indicated by a depth value of a pixel at the subject position.

3. The image processing apparatus according to claim 2,
wherein the subject position detection unit is configured to detect, as the subject position in the image, a position of a human face included in the image, to obtain the subject position information which indicates the position of the human face as the subject position.

4. The image processing apparatus according to claim 1,
wherein the embedment region determination unit is configured to determine, using the depth information, the embedment region which is made up of a plurality of the pixels each having a depth value within a predetermined range from a predetermined depth value.

5. The image processing apparatus according to claim 1, wherein the embedment region determination unit is configured to determine, using the depth information, the embedment region which is made up of a plurality of the pixels each having a depth value within a predetermined range from a depth value whose frequency of appearance in depth values of the pixels is at a peak.

6. The image processing apparatus according to claim 1, wherein the embedment region determination unit is configured to determine, using the depth information, the embedment region which is made up of a plurality of the pixels each having a depth value indicating a position further back than a position indicated by a predetermined depth value, the depth value being within a predetermined range from a depth value whose frequency of appearance in depth values of the pixels is at a peak.

7. The image processing apparatus according to claim 1, wherein the depth information obtainment unit is configured to obtain the depth information which includes information indicating reliability of the depth value of each of the pixels in the image.

8. The image processing apparatus according to claim 7, wherein the embedment region determination unit is configured to determine, using the depth information, the embedment region which includes a pixel which has a depth value with reliability lower than predetermined reliability.

9. The image processing apparatus according to claim 1, wherein the embedment region determination unit is configured to determine, using the depth information, the embedment region from a region excluding a subject position in the image, the subject position being a position of a predetermined subject included in the image.

10. The image processing apparatus according to claim 1, wherein the embedment region determination unit is configured to set a size of the embedment region using an amount of the embedment information obtained by the embedment information obtainment unit, and determine the embedment region which has the set size.

11. The image processing apparatus according to claim 1, wherein the embedment region determination unit is configured to determine the embedment region from a region excluding a subject position in the image, when the embedment region which meets a condition used for determining the embedment region using the depth information is not present, the subject position being a position of a predetermined subject included in the image.

12. The image processing apparatus according to claim 1, further comprising:
a depth value determination unit configured to determine a depth value of the embedment information; and
an embedment unit configured to embed the embedment information into the embedment region within the image using the depth value determined by the depth value determination unit.

13. The image processing apparatus according to claim 12, wherein the depth value determination unit is configured to determine the depth value of the embedment information which is to be embedded into the embedment region determined from a region excluding a subject position in the image, to be a depth value indicating a position further forward than a position indicated by a depth value at the subject position, when the embedment region which meets a condition used for determining the embedment region using the depth information is not present, the subject position being a position of a predetermined subject included in the image.

14. The image processing apparatus according to claim 12, wherein the depth value determination unit is configured to determine the depth value of the embedment information to be a depth value of the same degree as a depth value at a subject position in the image, the subject position being a position of a predetermined subject included in the image.

15. The image processing apparatus according to claim 4, wherein the depth value determination unit is configured to determine the depth value of the embedment information which is to be embedded into the embedment region determined from a region excluding a subject position in the image, to be a depth value indicating a position further forward than a position indicated by a depth value at the subject position, when the embedment region which meets a condition used for determining the embedment region using the depth information is not present, the subject position being a position of a predetermined subject included in the image.

16. The image processing apparatus according to claim 1, wherein the embedment information obtainment unit is configured to obtain the embedment information which includes at least one of text, a decoration part, a frame, and an image.

17. The image processing apparatus according to claim 1, wherein the embedment region determination unit is configured to determine, using the depth information, whether or not a predetermined subject included in the image is close, when the embedment region which meets the condition used for determining the embedment region is not present, and
the display unit is configured to display the notification message which includes a message prompting the user to shoot the subject at a greater distance from the subject, when it is determined that the subject is close.

18. An imaging apparatus comprising
the image processing apparatus according to claim 1, wherein the image obtainment unit is configured to obtain the image by shooting a subject.

19. An image processing method comprising:
obtaining an image;
obtaining, using a microprocessor, embedment information that is to be embedded into a region within the image;
obtaining depth information indicating a depth value of each of pixels in the image;
setting, using the depth information, a search region that is a portion of the image and made up of a plurality of the pixels each having a depth value indicating a position further back than a position indicated by a predetermined depth value;
determining, in the portion that is the set search region, an embedment region that is the region into which the embedment information is to be embedded; and
displaying the image,
wherein in the displaying, a notification message is displayed to a user when the embedment region which meets a condition used for determining the embedment region is not present, the notification message indicating that the embedment region is not present.

* * * * *